United States Patent
Smith et al.

(10) Patent No.: US 11,907,704 B2
(45) Date of Patent: *Feb. 20, 2024

(54) ATTESTATION MANIFEST DERIVATION AND DISTRIBUTION USING SOFTWARE UPDATE IMAGE

(71) Applicant: Intel Corporation, Santa Clara, CA (US)

(72) Inventors: Ned M. Smith, Beaverton, OR (US); Kshitij Arun Doshi, Tempe, AZ (US); John J. Browne, Limerick (IE); Vincent J. Zimmer, Tacoma, WA (US); Francesc Guim Bernat, Barcelona (ES); Kapil Sood, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/734,669

(22) Filed: May 2, 2022

(65) Prior Publication Data

US 2022/0334823 A1 Oct. 20, 2022

Related U.S. Application Data

(63) Continuation of application No. 16/235,598, filed on Dec. 28, 2018, now Pat. No. 11,327,735.

(Continued)

(51) Int. Cl.
*G06F 8/65* (2018.01)
*G06F 21/44* (2013.01)
(Continued)

(52) U.S. Cl.
CPC .............. *G06F 8/65* (2013.01); *G06F 21/44* (2013.01); *G06F 21/64* (2013.01); *H04L 9/0861* (2013.01);
(Continued)

(58) Field of Classification Search
CPC . G06F 8/65; G06F 21/44; G06F 21/64; H04L 9/0861; H04L 9/0891;
(Continued)

(56) References Cited

U.S. PATENT DOCUMENTS 11,327,735 B2 5/2022 Smith et al.
2012/0166795 A1* 6/2012 Wood .................... G06F 21/57
713/189

(Continued)

OTHER PUBLICATIONS

Claudio Soriente et al.; On the Difficulty of Software-Based Attestation of Embedded Devices; ACM; pp. 400-409; retrieved on Sep. 20, 2023. (Year: 2009).*

(Continued)

*Primary Examiner* — S. Sough
*Assistant Examiner* — Cuong V Luu
(74) *Attorney, Agent, or Firm* — Schwegman Lundberg & Woessner, P.A.

(57) ABSTRACT

Various systems and methods for enabling derivation and distribution of an attestation manifest for a software update image are described. In an example, these systems and methods include orchestration functions and communications, providing functionality and components for a software update process which also provides verification and attestation among multiple devices and operators.

20 Claims, 17 Drawing Sheets

Related U.S. Application Data

(60) Provisional application No. 62/746,385, filed on Oct. 16, 2018.

(51) Int. Cl.

| | |
|---|---|
| *G06F 21/64* | (2013.01) |
| *H04L 9/12* | (2006.01) |
| *H04L 9/14* | (2006.01) |
| *H04L 9/40* | (2022.01) |
| *H04L 9/32* | (2006.01) |
| *H04L 9/08* | (2006.01) |

(52) U.S. Cl.
CPC .......... *H04L 9/0891* (2013.01); *H04L 9/0894* (2013.01); *H04L 9/12* (2013.01); *H04L 9/14* (2013.01); *H04L 9/3213* (2013.01); *H04L 9/3228* (2013.01); *H04L 9/3236* (2013.01); *H04L 9/3247* (2013.01); *H04L 9/3263* (2013.01); *H04L 9/3273* (2013.01); *H04L 63/0876* (2013.01); *H04L 63/12* (2013.01)

(58) Field of Classification Search
CPC . H04L 9/0894; H04L 9/12; H04L 9/14; H04L 9/3213; H04L 9/3228; H04L 9/3236; H04L 9/3247; H04L 9/3263; H04L 9/3273; H04L 63/0876; H04L 63/12
See application file for complete search history.

(56) References Cited

U.S. PATENT DOCUMENTS

| | | |
|---|---|---|
| 2013/0322354 A1 | 12/2013 | Wang |
| 2014/0301548 A1 | 10/2014 | Thorpe |
| 2017/0024570 A1 | 1/2017 | Pappachan et al. |
| 2017/0366359 A1* | 12/2017 | Scarlata .................... H04L 9/14 |
| 2019/0138294 A1 | 5/2019 | Smith et al. |
| 2019/0278911 A1 | 9/2019 | Pappachan et al. |
| 2020/0021445 A1* | 1/2020 | Caceres .................. G06F 21/44 |

OTHER PUBLICATIONS

Nicola Dragoni et al.; State-of-the-Art Software-Based Remote Attestation: Opportunities and Open Issues for Internet of Things; MDPI; 23 pages; retrieved on Sep. 20, 2023. (Year: 2021).*

"Network Functions Virtualisation (NFV) Release 3; Security; Security Management and Monitoring specification", ETSI GS NFV-SEC 013 V3.1.1, (Feb. 2017), 54 pgs.

"U.S. Appl. No. 16/235,598, Non Final Office Action dated Mar. 24, 2020", 29 pgs.

"U.S. Appl. No. 16/235,598, Response filed Jun. 24, 2020 to Non Final Office Action dated Mar. 24, 2020", 14 pgs.

"U.S. Appl. No. 16/235,598, Final Office Action dated Aug. 4, 2020", 33 pgs.

"U.S. Appl. No. 16/235,598, Response filed Nov. 4, 2020 to Final Office Action dated Aug. 4, 2020", 14 pgs.

"U.S. Appl. No. 16/235,598, Non Final Office Action dated Apr. 6, 2021", 35 pgs.

"U.S. Appl. No. 16/235,598, Response filed Aug. 6, 2021 to Non Final Office Action dated Apr. 6, 2021", 15 pgs.

"U.S. Appl. No. 16/235,598, Final Office Action dated Aug. 23, 2021", 19 pgs.

"U.S. Appl. No. 16/235,598, Response filed Nov. 23, 2021 to Final Office Action dated Aug. 23, 2021", 14 pgs.

"U.S. Appl. No. 16/235,598, Notice of Allowance dated Jan. 10, 2022", 21 pgs.

Asokan, N, "SEDA: Scalable Embedded Device Attestation", CCS15, (Oct. 2015), 12 pgs.

Eldefrawy, Karim, "PURE Using Verified Remote Attestation to Obtain Proofs of Update Reset and Erasure in Low-End Embedded Systems", IEEE, Retrieved on Dec. 3, 2021, (2019), 8 pgs.

Moran, B, "A Firmware Update Architecture for Internet of Things Devices draft-ietf-suit-architecture-01", SUIT Internet-Draft, (Jul. 2, 2018), 22 pgs.

Seshadri, Arvind, "SWATT SoftWare-based ATTestation for Embedded Devices", IEEE, Retrieved on Dec. 3, 2021, (2004), 11 pgs.

* cited by examiner

US 11,907,704 B2

ATTESTATION MANIFEST DERIVATION AND DISTRIBUTION USING SOFTWARE UPDATE IMAGE

PRIORITY CLAIM

This application is a continuation of U.S. application Ser. No. 16/235,598 issued as U.S. Pat. No. 11,327,735, filed Dec. 28, 2018, which claims the benefit of priority under 35 U.S.C. § 119(e) of U.S. Provisional Patent Application Ser. No. 62/746,385, filed on Oct. 16, 2018, and titled "ATTESTATION MANIFEST DERIVATION AND DISTRIBUTION USING SOFTWARE UPDATE IMAGE," all of which are herein incorporated by reference in their entirety.

TECHNICAL FIELD

Embodiments described herein generally relate to data processing, network communication, and communication system implementations, and in particular, to techniques for updating software of respective endpoint devices connected in edge computing, multi-access edge computing (MEC), and Internet of Things (IoT) device networks.

BACKGROUND

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service which offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at "edge" of the network.

Edge computing may be further integrated with use cases and technology developed for the Internet of Things (IoT) and Fog networking, as endpoint devices and gateways attempt to access network resources and applications at locations moved closer to the "edge" of the network. For instance, developing edge computing use cases in mobile network settings have been designed for integration with multi-access edge computing (MEC), also known as "mobile edge computing". MEC approaches are designed to allow application developers and content providers to access computing capabilities and an IT service environment in dynamic mobile network settings at the edge of the network. Limited standards have been developed by the European Telecommunications Standards Institute (ETSI) industry specification group (ISG) in an attempt to define common interfaces for operation of MEC systems, platforms, hosts, services, and applications.

MEC offers application developers and content providers cloud-computing capabilities and an IT service environment at the edge of the network. This environment is characterized by ultra-low latency and high bandwidth as well as real-time access to radio network information that may be leveraged by applications. MEC technology permits operators to flexibly and rapidly deploy innovative applications and services towards mobile subscribers, enterprises and vertical segments.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations with orchestration, coordination, and resource management, especially in complex mobility settings where many participants (devices, hosts, service providers, operators) are involved. As a result, many proposed architectures have not achieved the full benefits that edge computing is intended to offer.

The deployment of IoT devices and MEC services have introduced a number of advanced use cases and scenarios occurring at the edge of the network. However, these advanced use cases have also introduced a number of corresponding technical challenges relating to security, processing and network resources, service availability and efficiency, among many other issues.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
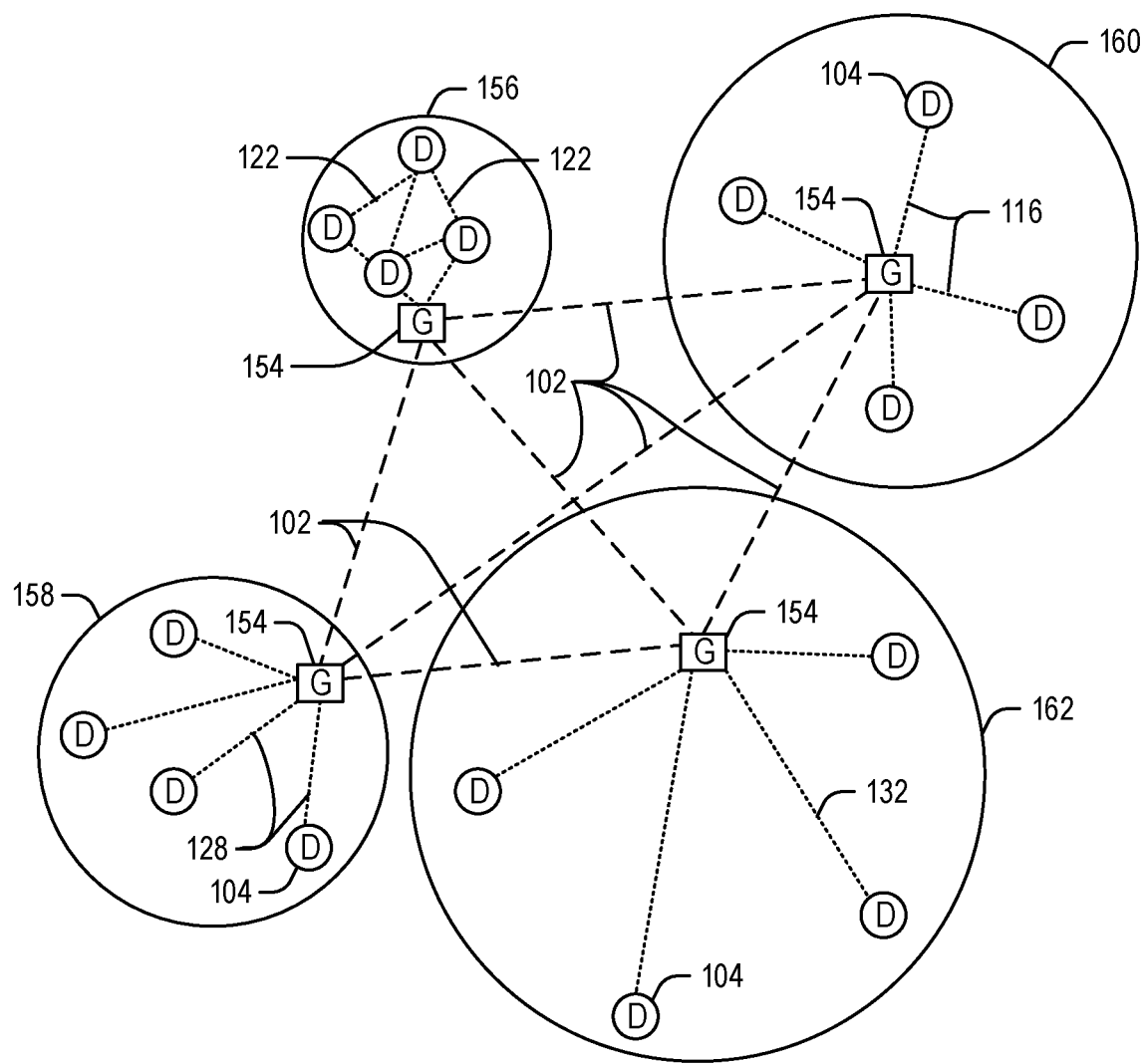
FIG. 1 illustrates a domain topology for respective Internet-of-Things (IoT) networks, according to an example.

In the following description, methods, configurations, and related apparatuses are disclosed for endpoint software update procedures, which can be coordinated and monitored in a variety of deployment environments involving the Internet of Things (IoT), network function virtualization (NFV), multi-access edge computing (MEC), and other aspects of distributed networking technologies. The following examples introduce specific software update functionality that can be coordinated with device orchestration, while tying software update management into an overall trust management architecture. These examples enable increased security, reliability, and control of the software update process, while introducing economy of scale improvements and coordination of software update procedures.

As an example of conventional techniques, current MEC deployments typically rely on disparate systems for managing software update, orchestration, and trust management functions. Such systems use dissimilar structures including manifests that makes it difficult for these services to coordinate with each other and for the supply chain/ecosystem to efficiently support well-coordinated Edge/MEC device operations. However, when deployed devices on a connected network install a software update, the characteristics of the devices change. When new device characteristics occur (e.g., migrating from version 1 to version 2) such characteristics may invalidate assumptions of the previously attested device among other devices in deployment. Further, authentication tokens, cryptographic identities and other keys and policies may be invalidated by the installation of a software update.

The following techniques disclose use of a software update package capable to derive a Reference Integrity Measurement (RIM). This update package triggers an orchestrator to create a RIM manifest that is broadcast and otherwise made available for re-verifying objects having attested state semantics such as authentication tokens, cryptographic identities and other keys and policies. When the software package is installed, the RIM is derived from the software package and supplied to attestation service provider. The delivery also triggers re-attestation of affected systems (even as some software update mechanisms use swarm/gossip update protocols). The techniques also re-generate attestation tokens that may be supplied as part of data access protocols which may need to be updated to reflect device state changes.

With the present techniques and configurations, the window in which a current attestation status is stale due to an applied software update can be reduced or eliminated in a MEC/NFV/Edge infrastructure through improved coordination of infrastructure services. As a result, the following provides improved manifest structures for software update and attestation and orchestration, including in converged/coordinated operation settings involving container/virtual machine (VM) orchestration, software update services, and attestation services, among others.

The present techniques and configurations may be utilized in connection with many aspects of current networking systems, but are provided with reference to IoT, MEC, and NFV deployments. The present techniques and configurations specifically may be (but are not required to be) relevant to the standards and approaches published in ETSI GS MEC-003 "Mobile Edge Computing (MEC); Framework and Reference Architecture" (e.g., V2.0.3); ETSI GS NFV-SEC 013 "Network Functions Virtualisation (NFV) Release 3; Security; Security Management and Monitoring" (e.g., v. 3.1.1) and related MEC, NFV, or networked operational implementations. However, while the present techniques and configurations may provide significant benefits to MEC architectures and other IoT device network architectures, the applicability of the present techniques and configurations may be extended to any number of edge computing devices or fog computing platforms.

The following provides a detailed discussion of these techniques within specific systems and services, but which are applicable to the larger context of IoT, fog network, and edge computing deployments. Further, the disclosed MEC and NFV system and service deployment examples provide one illustrative example of a fog device or fog system, but many other combinations and layouts of devices and systems located at the edge of a network may be provided. Further, the techniques disclosed herein may relate to other IoT and network communication standards and configurations, and other intermediate processing entities and architectures.

FIG. 1 illustrates an example domain topology for respective distributed (e.g., IoT) networks coupled through links to respective gateways. The IoT is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
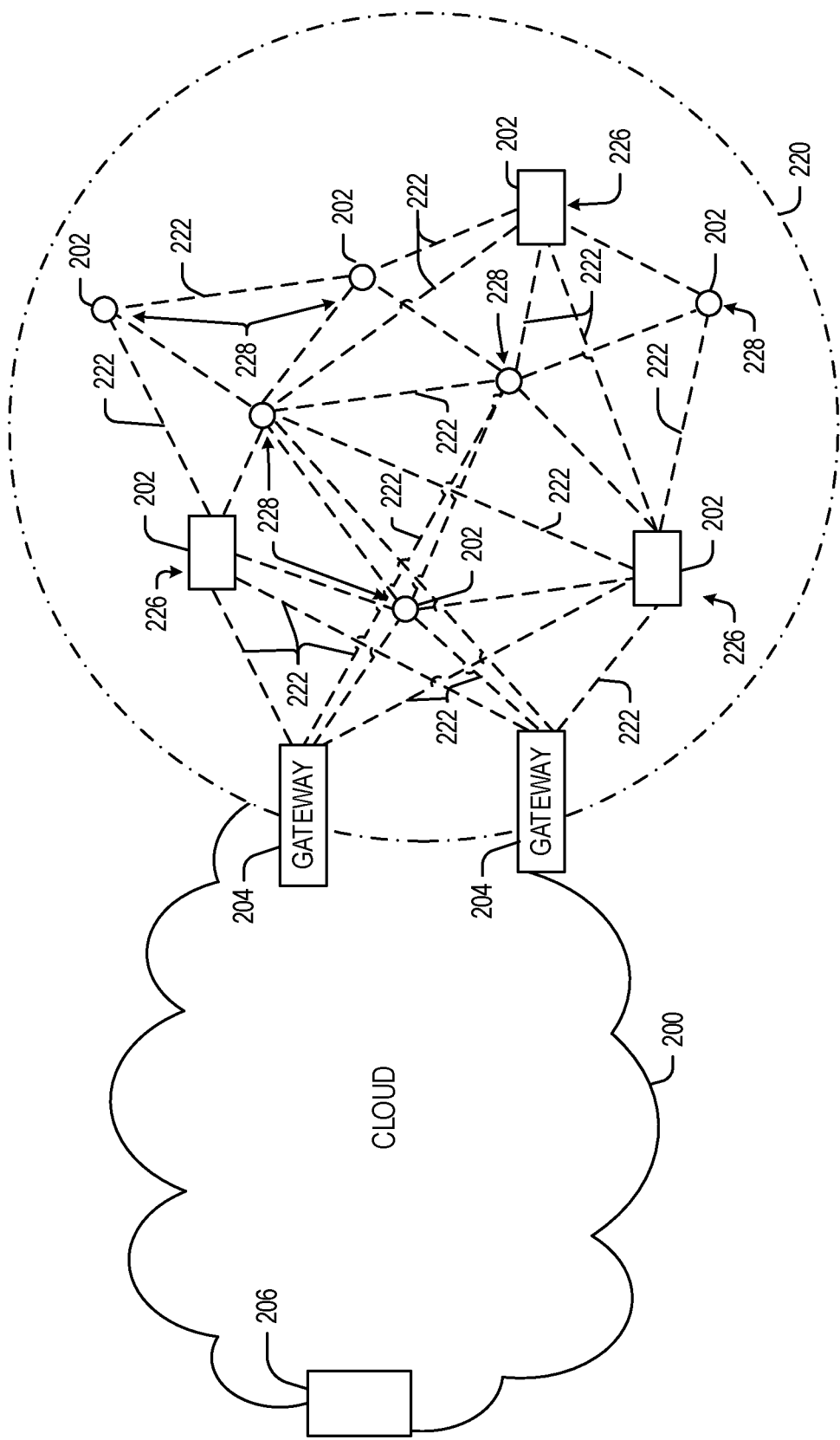
FIG. 2 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of internet-of-things (IoT) networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 3 and 4.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 2 below.

FIG. 2 illustrates a cloud computing network in communication with a mesh network of IoT devices (devices 202) operating as a fog device at the edge of the cloud computing network. The mesh network of IoT devices may be termed a fog 220, operating at the edge of the cloud 200. To simplify the diagram, not every IoT device 202 is labeled.

The fog 220 may be considered to be a massively interconnected network wherein a number of IoT devices 202 are in communications with each other, for example, by radio links 222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog 220 and may also provide the backend process function for data obtained from sensors 228, such as motion data, flow data, temperature data, and the like. The data aggregators 226 may collect data from any number of the sensors 228 and perform the back-end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog 220 provided from these IoT devices 202 may be presented to devices in the cloud 200, such as a server 206, as a single device located at the edge of the cloud 200, e.g., a fog device. In this example, the alerts coming from the fog device may be sent without being identified as coming from a specific IoT device 202 within the fog 220. In this fashion, the fog 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog 220 device to the server 206 to answer the query. In this example, IoT devices 202 in the fog 220 may select the sensors 228 used based on the query, such as adding data from flow sensors or temperature sensors. Further, if some of the IoT devices 202 are not operational, other IoT devices 202 in the fog 220 device may provide analogous data, if available.

Figure 3:
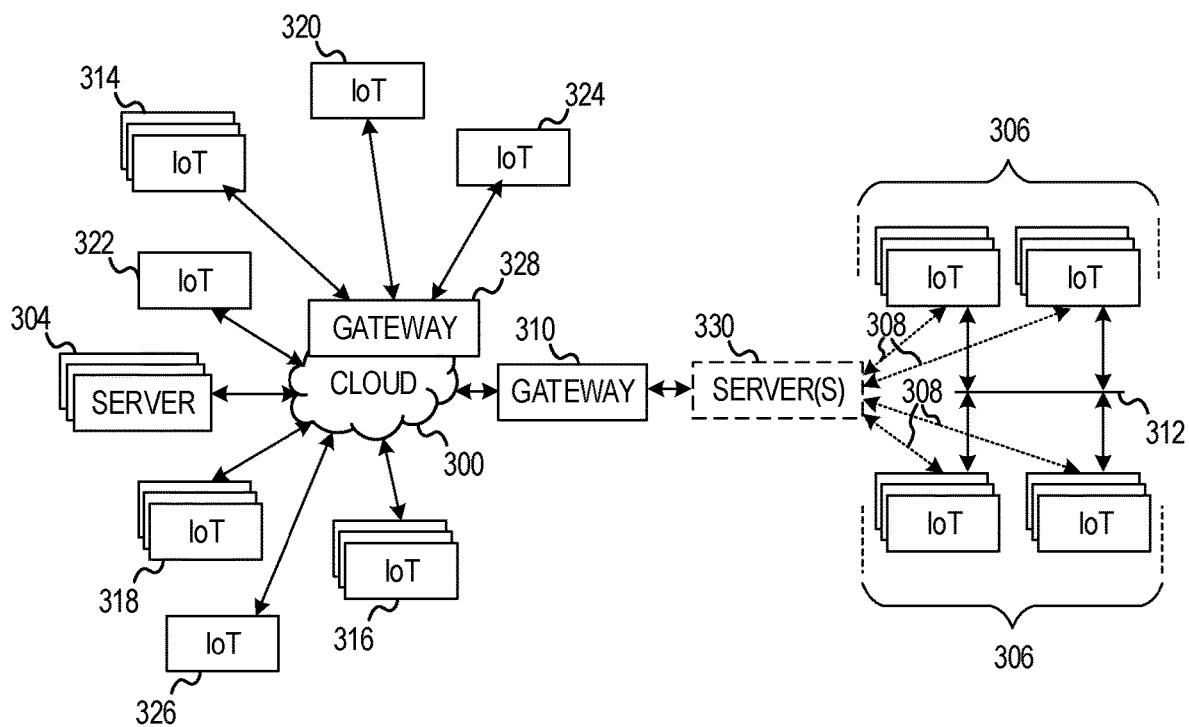
FIG. 3 includes a block diagram of a network illustrating communications among a number of IoT devices, according to an example.

FIG. 3 illustrates a drawing of a cloud computing network, or cloud 300, in communication with a number of Internet of Things (IoT) devices. The cloud 300 may represent the Internet, a local area network (LAN), or a wide area network (WAN), such as a proprietary network for a company. The IoT devices may include any number of different types of devices, grouped in various combinations. For example, a traffic control group 306 may include IoT devices along streets in a city. These IoT devices may include stoplights, traffic flow monitors, cameras, weather sensors, and the like. The traffic control group 306, or other subgroups, may be in communication with the cloud 300 through wired or wireless links 308, such as LPWA links, optical links, and the like. Further, a wired or wireless sub-network 312 may allow the IoT devices to communicate with each other, such as through a local area network, a wireless local area network, and the like. The IoT devices may use another device, such as a gateway 310 or 328 to communicate with remote locations such as the cloud 300; the IoT devices may also use one or more servers 330 to facilitate communication with the cloud 300 or with the gateway 310. For example, the one or more servers 330 may operate as an intermediate network node to support a local edge cloud or fog implementation among a local area network. Further, the gateway 328 that is depicted may operate in a cloud-to-gateway-to-many edge devices configuration, such as with the various IoT devices 314, 320, 324 being constrained or dynamic to an assignment and use of resources in the cloud 300.

Other example groups of IoT devices may include remote weather stations 314, local information terminals 316, alarm systems 318, automated teller machines 320, alarm panels 322, or moving vehicles, such as emergency vehicles 324 or other vehicles 326, among many others. Each of these IoT devices may be in communication with other IoT devices, with servers 304, with another IoT fog device or system, or a combination therein. The groups of IoT devices may be deployed in various residential, commercial, and industrial settings (including in both private or public environments).

As may be seen from FIG. 3, a large number of IoT devices may be communicating through the cloud 300. This may allow different IoT devices to request or provide information to other devices autonomously. For example, a group of IoT devices (e.g., the traffic control group 306) may request a current weather forecast from a group of remote weather stations 314, which may provide the forecast without human intervention. Further, an emergency vehicle 324 may be alerted by an automated teller machine 320 that a burglary is in progress. As the emergency vehicle 324 proceeds towards the automated teller machine 320, it may access the traffic control group 306 to request clearance to the location, for example, by lights turning red to block cross traffic at an intersection in sufficient time for the emergency vehicle 324 to have unimpeded access to the intersection.

Clusters of IoT devices, such as the remote weather stations 314 or the traffic control group 306, may be equipped to communicate with other IoT devices as well as with the cloud 300. This may allow the IoT devices to form an ad-hoc network between the devices, allowing them to function as a single device, which may be termed a fog device or system (e.g., as described above).

Figure 4:
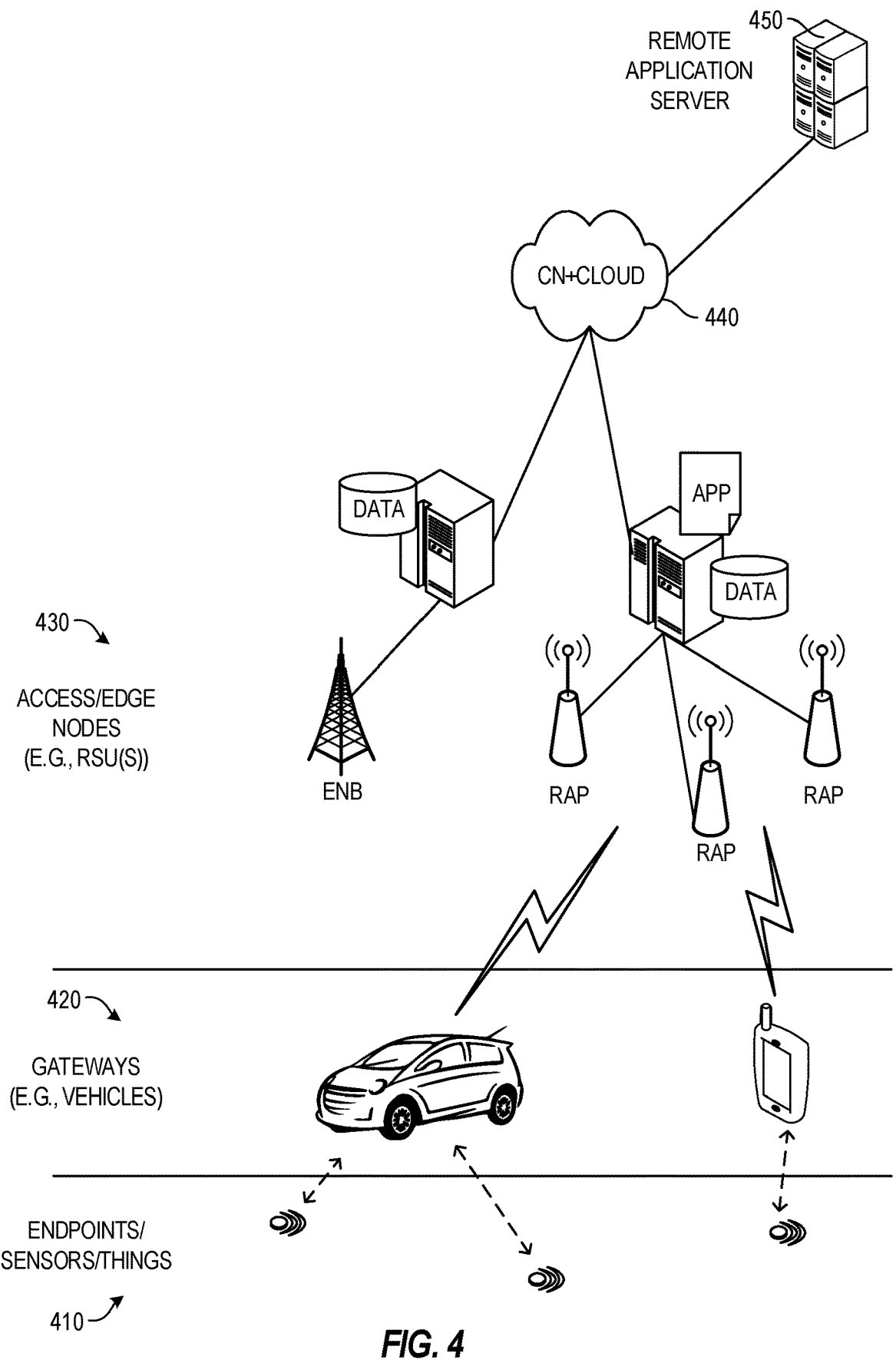
FIG. 4 illustrates devices and network entities in a dynamic communications environment, according to an example.

FIG. 4 illustrates devices and network entities in a multi-access communications environment. FIG. 4 specifically illustrates the different layers of communication occurring within the environment, starting from endpoint sensors or things 410 (e.g., operating in an IoT network topology); increasing in sophistication to gateways (e.g., vehicles) or intermediate nodes 420, which facilitate the collection and processing of data from endpoints 410; increasing in processing and connectivity sophistication to access or edge nodes 430 (e.g., road-side units operating as edge computing nodes), such as may be embodied by base stations (eNBs), roadside access points (RAPs) or roadside units (RSUs), nodes, or servers; and increasing in connectivity and processing sophistication to a core network or cloud setting 440. Indeed, the processing at the core network or cloud setting 440 may be enhanced by network services as performed by a remote application server 450 or other cloud services.

As shown, in the scenario of FIG. 4, the endpoints 410 communicate various types of information to the gateways or intermediate nodes 420; however, due to the mobility of the gateways or intermediate nodes 420 (such as in a vehicle or mobile computing device) this results in multiple access points or types of access points being used for network access, multiple distinct services and servers being used for computing operations, multiple distinct applications and data being available for processing, and multiple distinct network operations being offered as the characteristics and capabilities of the available network services and network pathways change. In particular, the environment may involve aspects of Vehicle-to-Infrastructure (V2X), Vehicle-to-Vehicle (V2V) and Vehicle-to-Infrastructure (V2I) services from vehicle user equipment (UE) or human-operated portable UEs (e.g., mobile smartphones and computing devices), which introduces significant complexity for computing services and network usage.

Figure 5:
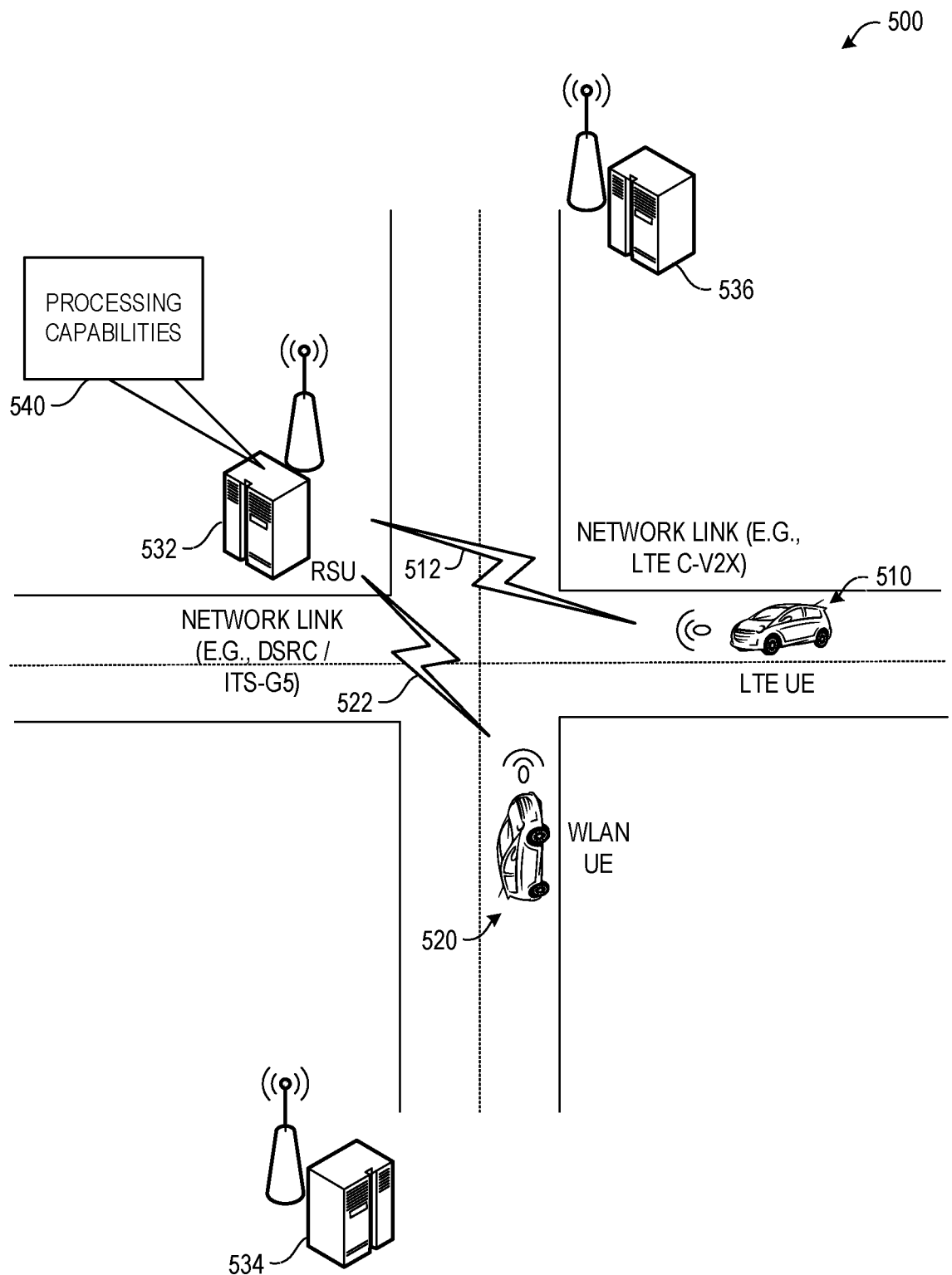
FIG. 5 illustrates an operative arrangement of network and mobile user equipment, according to an example.

FIG. 5 illustrates an operative arrangement 500 of network and vehicle user equipment, in which various embodiments may be practiced. In arrangement 500, vehicle user equipment (vUE) 510, 520 may operate with a defined communication system (e.g., using a LTE C-V2X WWAN 512, or a SRC/ETSI ITS-G5 (WLAN) communication network 522, etc.). In embodiments, a Road Side Unit (RSU) 532 may provide processing services 540 by which the vUEs 510 and 520 may communicate with one another (or to other services), execute services individually and with each other, or access similar aspects of coordinated or device-specific edge computing services. In embodiments, the processing services 540 may be provided by a MEC host (e.g., an ETSI MEC host), MEC platform, or other MEC entity implemented in or by hardware of the RSU 532. In this example, the RSU 532 may be a stationary RSU, such as an eNB-type RSU or other like infrastructure. In other embodiments, the RSU 532 may be a mobile RSU or a UE-type RSU, which may be implemented by a vehicle (e.g., a truck), pedestrian, or some other device with such capabilities. In these cases, mobility issues can be managed in order to ensure a proper radio coverage of the applicable services. For instance, mobility may be managed as the respective vUEs 520, 510 transition from, and to, operation at other RSUs, such as RSUs 534, 536, and other network nodes not shown.

The following describes aspects of a service validation and rating system, for use of edge computing services, such as in the environments depicted in FIGS. 4 and 5. The service validation and rating system is associated with each edge computing service and may be used and maintained by a variety of data sources, from end customers (including consumer users, consumer devices, etc.) to edge operational environment entities such as an orchestrator, edge service provider, edge hosting service, or the like. As discussed further below, relevant information for the system may be persisted for verification through use of a reputation service or blockchain service. For instance, a blockchain distributed ledger may provide a safe and auditable location to store ratings information and resulting service information.

In further examples, a ratings aggregator service may be involved in computing a rating (e.g., a numerical value, or a "star"-based rating) of a particular edge service from the various inputs. The rating may be included in a SLA for a new customer (e.g., user, consumer device, etc.) where the customer specifies a minimum acceptable rating for some aspect of the service in the SLA contract. An orchestrator may provide evidence/proof of an accurate rating before the SLA is finalized. Data obtained from the reputation service or blockchain may be utilized to accomplish this evidence.

Figure 6:
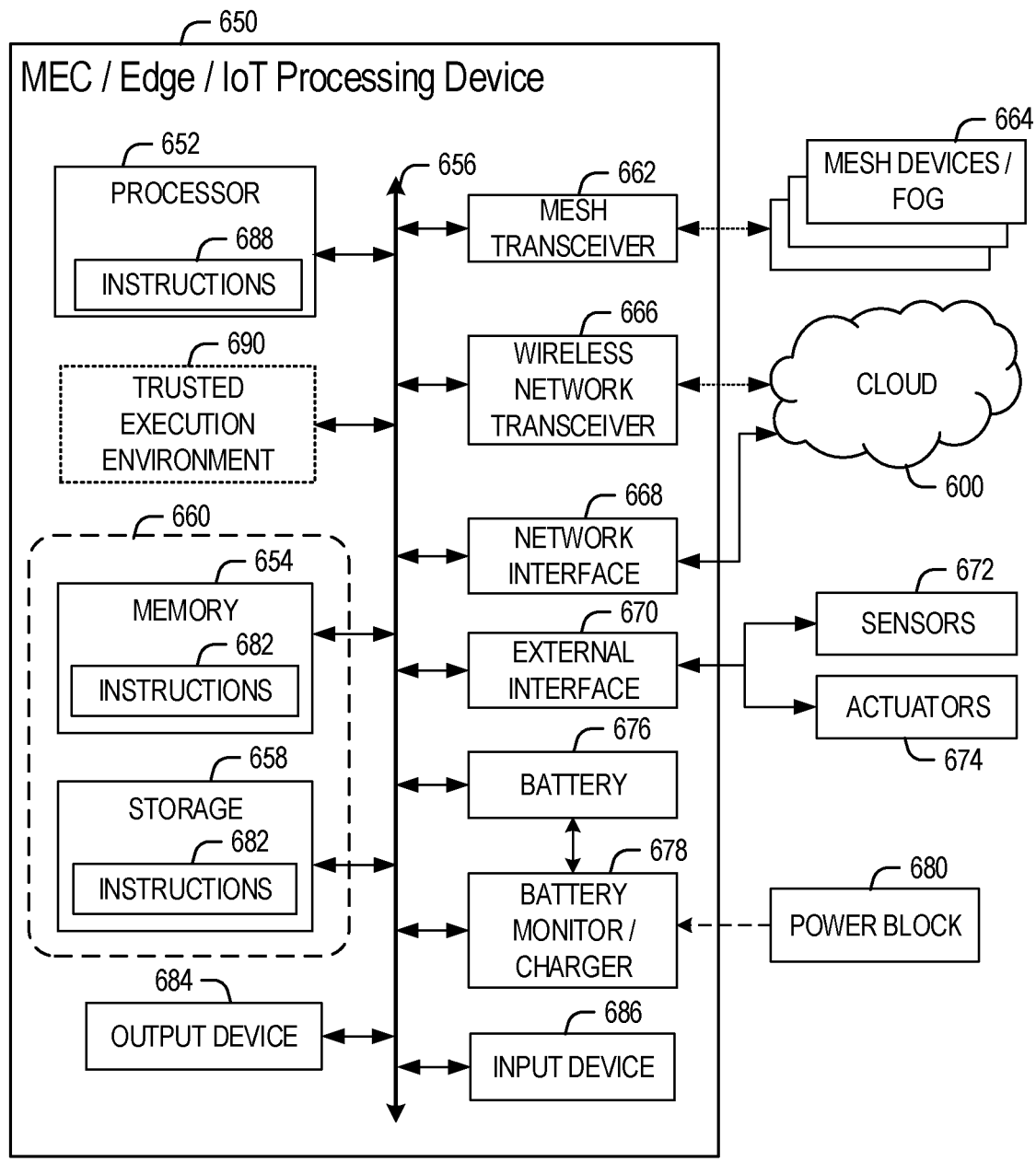
FIG. 6 includes a block diagram for a processing system architecture in which any one or more of the techniques (e.g., operations, processes, methods, and methodologies) discussed herein may be performed, according to an example.

FIG. 6 is a block diagram of an example of components that may be present in an IoT device 650 for implementing the techniques described herein. The IoT device 650 may include any combinations of the components shown in the example or referenced in the disclosure above. The components may be implemented as ICs, portions thereof, discrete electronic devices, or other modules, logic, hardware, software, firmware, or a combination thereof adapted in the IoT device 650, or as components otherwise incorporated within a chassis of a larger system. Additionally, the block diagram of FIG. 6 is intended to depict a high-level view of components of the IoT device 650. However, some of the components shown may be omitted, additional components may be present, and different arrangement of the components shown may occur in other implementations.

The IoT device 650 may include a processor 652, which may be a microprocessor, a multi-core processor, a multi-threaded processor, an ultra-low voltage processor, an embedded processor, or other known processing element. The processor 652 may be a part of a system on a chip (SoC) in which the processor 652 and other components are formed into a single integrated circuit, or a single package, such as the Edison™ or Galileo™ SoC boards from Intel. As an example, the processor 652 may include an Intel® Architecture Core™ based processor, such as a Quark™, an Atom™, an i3, an i5, an i7, or an MCU-class processor, or another such processor available from Intel® Corporation, Santa Clara, California. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or customer thereof, or their licensees or adopters. The processors may include units such as an A5-A11 processor from Apple® Inc., a Snapdragon™ processor from Qualcomm® Technologies, Inc., or an OMAP™ processor from Texas Instruments, Inc.

The processor 652 may communicate with a system memory 654 over an interconnect 656 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 658 may also couple to the processor 652 via the interconnect 656. In an example, the storage 658 may be implemented via a solid state disk drive (SSDD). Other devices that may be used for the storage 658 include flash memory cards, such as SD cards, microSD cards, xD picture cards, and the like, and USB flash drives. In low power implementations, the storage 658 may be on-die memory or registers associated with the processor 652. However, in some examples, the storage 658 may be implemented using a micro hard disk drive (HDD). Further, any number of new technologies may be used for the storage 658 in addition to, or instead of, the technologies described, such resistance change memories, phase change memories, holographic memories, or chemical memories, among others.

The components may communicate over the interconnect 656. The interconnect 656 may include any number of technologies, including industry standard architecture (ISA), extended ISA (EISA), peripheral component interconnect (PCI), peripheral component interconnect extended (PCIx), PCI express (PCIe), or any number of other technologies. The interconnect 656 may be a proprietary bus, for example, used in a SoC based system. Other bus systems may be included, such as an I2C interface, an SPI interface, point to point interfaces, and a power bus, among others.

The interconnect 656 may couple the processor 652 to a mesh transceiver 662, for communications with other mesh devices 664. The mesh transceiver 662 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 664. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 662 may communicate using multiple standards or radios for communications at different range. For example, the IoT device 650 may communicate with close devices, e.g., within about 2 meters, using a local transceiver based on BLE, or another low power radio, to save power. More distant mesh devices 664, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 666 may be included to communicate with devices or services in the cloud 600 via local or wide area network protocols. The wireless network transceiver 666 may be a LPWA transceiver that follows the IEEE 802.15.4, or IEEE 802.15.4g standards, among others. The IoT device 650 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 662 and wireless network transceiver 666, as described herein. For example, the radio transceivers 662 and 666 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 662 and 666 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 666, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 668 may be included to provide a wired communication to the cloud 600 or to other devices, such as the mesh devices 664. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 668 may be included to allow connect to a second network, for example, a NIC 668 providing communications to the cloud over Ethernet, and a second NIC 668 providing communications to other devices over another type of network.

The interconnect 656 may couple the processor 652 to an external interface 670 that is used to connect external devices or subsystems. The external devices may include sensors 672, such as accelerometers, level sensors, flow sensors, optical light sensors, camera sensors, temperature sensors, a global positioning system (GPS) sensors, pressure sensors, barometric pressure sensors, and the like. The external interface 670 further may be used to connect the IoT device 650 to actuators 674, such as power switches, valve actuators, an audible sound generator, a visual warning device, and the like.

In some optional examples, various input/output (I/O) devices may be present within, or connected to, the IoT device 650. For example, a display or other output device 684 may be included to show information, such as sensor readings or actuator position. An input device 686, such as a touch screen or keypad may be included to accept input. An output device 684 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 650.

A battery 676 may power the IoT device 650, although in examples in which the IoT device 650 is mounted in a fixed location, it may have a power supply coupled to an electrical grid. The battery 676 may be a lithium ion battery, or a metal-air battery, such as a zinc-air battery, an aluminum-air battery, a lithium-air battery, and the like.

A battery monitor/charger 678 may be included in the IoT device 650 to track the state of charge (SoCh) of the battery 676. The battery monitor/charger 678 may be used to monitor other parameters of the battery 676 to provide failure predictions, such as the state of health (SoH) and the state of function (SoF) of the battery 676. The battery monitor/charger 678 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 678 may communicate the information on the battery 676 to the processor 652 over the interconnect 656. The battery monitor/charger 678 may also include an analog-to-digital (ADC) convertor that allows the processor 652 to directly monitor the voltage of the battery 676 or the current flow from the battery 676. The battery parameters may be used to determine actions that the IoT device 650 may perform, such as transmission frequency, mesh network operation, sensing frequency, and the like.

A power block 680, or other power supply coupled to a grid, may be coupled with the battery monitor/charger 678 to charge the battery 676. In some examples, the power block 680 may be replaced with a wireless power receiver to obtain the power wirelessly, for example, through a loop antenna in the IoT device 650. A wireless battery charging circuit, such as an LTC4020 chip from Linear Technologies of Milpitas, California, among others, may be included in the battery monitor/charger 678. The specific charging circuits chosen depend on the size of the battery 676, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 658 may include instructions 682 in the form of software, firmware, or hardware commands to implement the techniques described herein. Although such instructions 682 are shown as code blocks included in the memory 654 and the storage 658, it may be understood that any of the code blocks may be replaced with hardwired circuits, for example, built into an application specific integrated circuit (ASIC).

In an example, the instructions 682 provided via the memory 654, the storage 658, or the processor 652 may be embodied as a non-transitory, machine readable medium 660 including code to direct the processor 652 to perform electronic operations in the IoT device 650. The processor 652 may access the non-transitory, machine readable medium 660 over the interconnect 656. For instance, the non-transitory, machine readable medium 660 may be embodied by devices described for the storage 658 of FIG. 6 or may include specific storage units such as optical disks, flash drives, or any number of other hardware devices. The non-transitory, machine readable medium 660 may further include, provide, or invoke instructions 688 to direct the processor 652 to perform a specific sequence or flow of actions, for example, as described with respect to the flowchart(s) and block diagram(s) of operations and functionality depicted above.

In an example, the instructions 688 on the processor 652 (separately, or in combination with the instructions 688 of the machine readable medium 660) may configure execution or operation of a trusted execution environment (TEE) 690. In an example, the TEE 690 operates as a protected area accessible to the processor 652 to enable secure access to data and secure execution of instructions. Various implementations of the TEE 690, and an accompanying secure area in the processor 652 or the memory 654 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 650 through the TEE 690 and the processor 652.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

In various examples, the operations and functionality described herein may be embodied by a machine, or set of machines in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the examples above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 7:
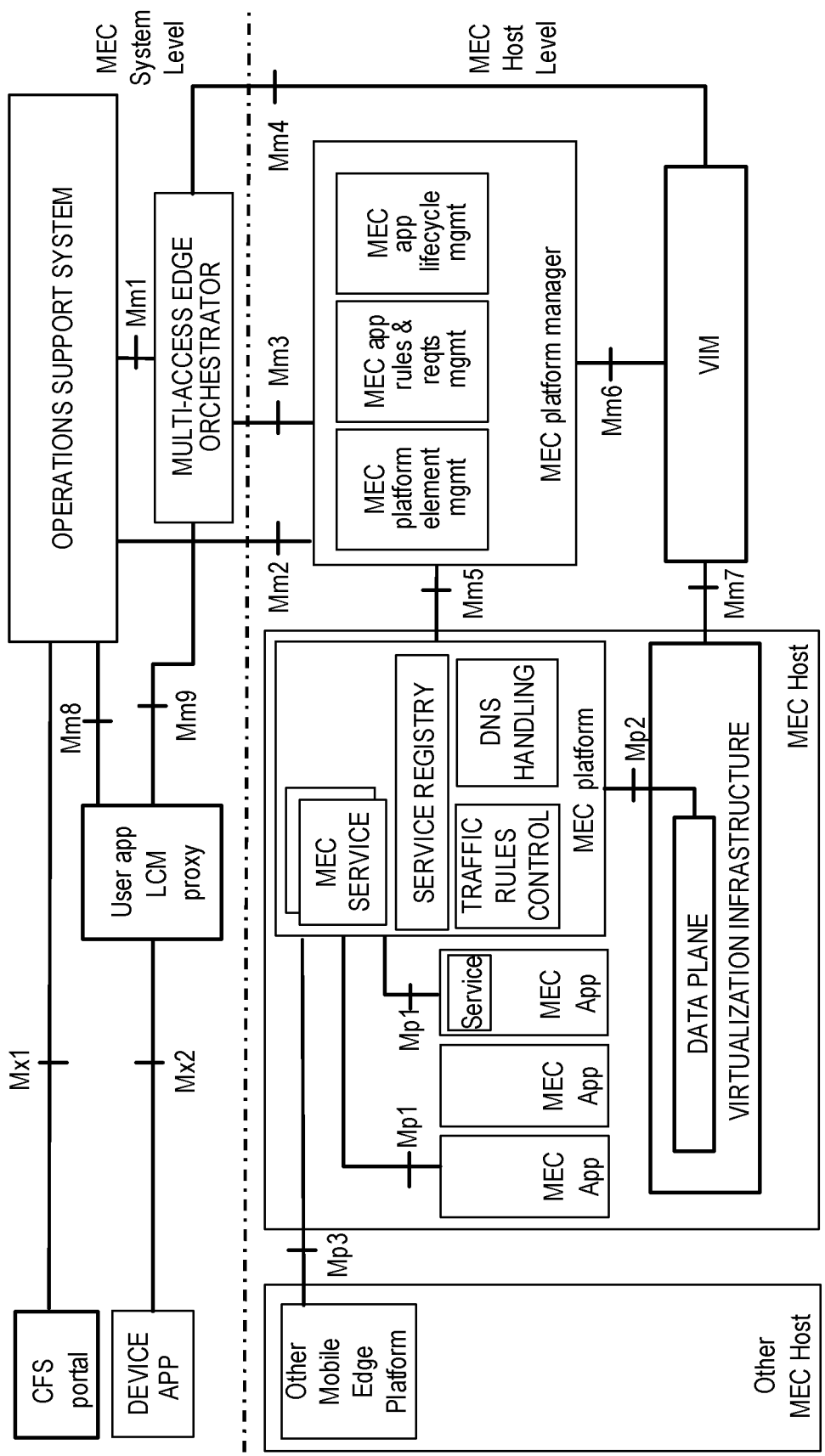
FIG. 7 includes a block diagram for a Multi-access Edge Computing (MEC) system architecture in which any one or more of the techniques (e.g., operations, processes, methods, and methodologies) discussed herein may be performed, according to an example.

FIG. 7 depicts a block diagram for an example Multi-access Edge Computing (MEC) system architecture. In an example, the MEC system architecture may be defined according to a specification, standard, or other definition (e.g., according to the ETSI ISG MEC-003 specification). In this diagram, Mp reference points refer to MEC platform functionality; Mm reference points refer to management; and Mx refers to connections to external entities.

MEC architectures offers application developers and content providers cloud-computing capabilities and an IT service environment at the edge of the network. This environment is characterized by ultra-low latency and high bandwidth as well as real-time access to radio network information that can be leveraged by applications. MEC technology thus permits flexible and rapid deployment of innovative applications and services towards mobile subscribers, enterprises and vertical segments. For instance, in automotive settings, applications such as V2X (vehicle-to-everything, IEEE 802.11p based or 3GPP LTE-V2X based) may use MEC technology to exchange data, provide data to aggregation points, and access data in databases to provide and obtain an overview of the local situation derived from a multitude of sensors (by various cars, roadside units, etc.).

In the context of a deployed system (such as the MEC system depicted in FIG. 7, or the NFV system depicted in FIG. 10, discussed below) the present techniques and configurations provide software update capabilities to any of the endpoint devices utilized in the deployed system. For instance, devices to be updated may include: the MEC host running multiple software/firmware instances; virtual machines, containers, and hosted environments used to operate applications; endpoint sensors and connected devices; and even servers and like host or system devices.

Figure 8:
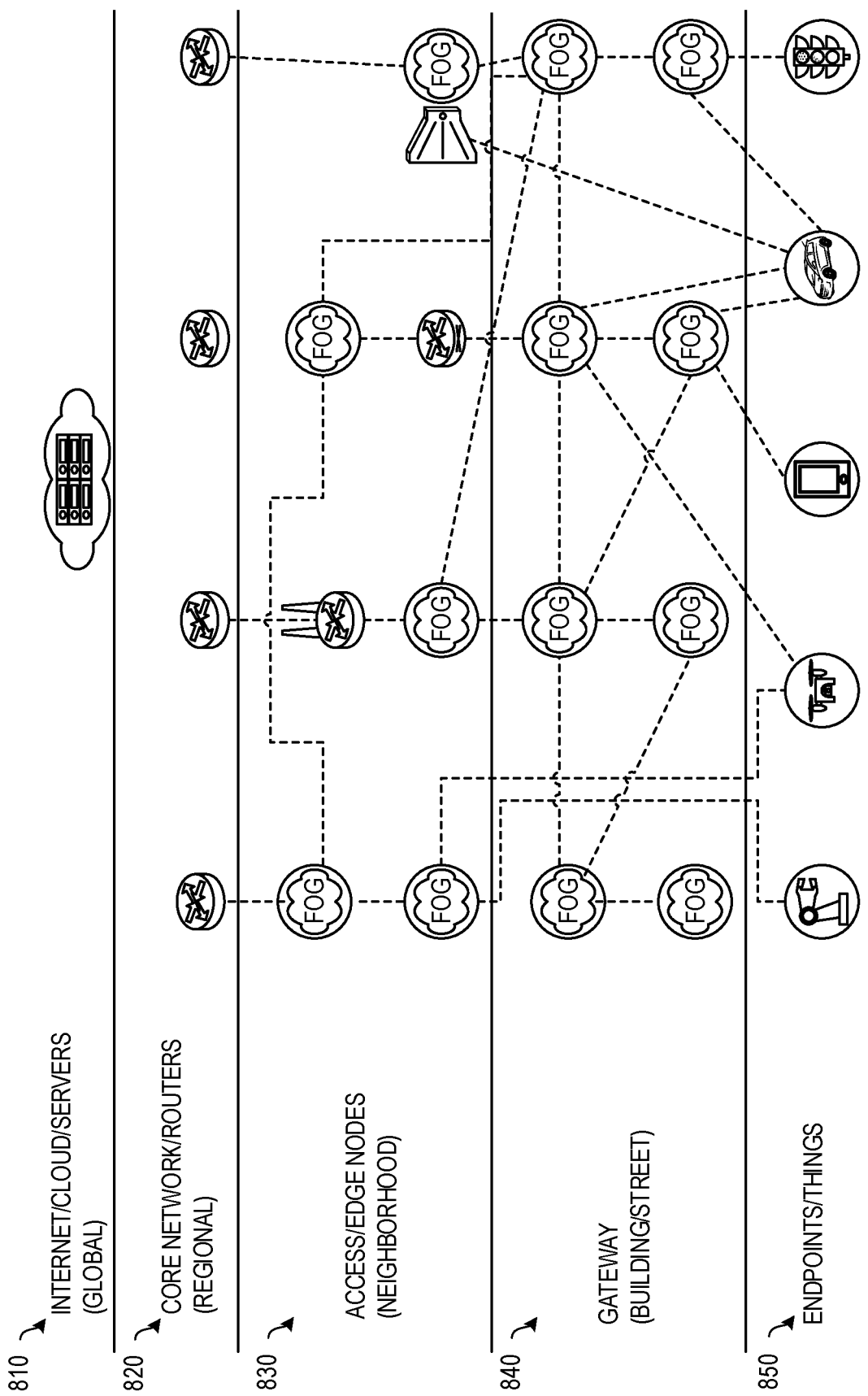
FIG. 8 illustrates a MEC and Fog network topology, according to an example.

FIG. 8 illustrates a MEC and Fog network topology, according to an example. This network topology, which includes a number of conventional networking layers, may be extended through use of the tags and objects discussed herein. Specifically, the relationships between endpoints (at endpoints/things network layer 850), gateways (at gateway layer 840), access or edge computing nodes (e.g., at neighborhood nodes layer 830), core network or routers (e.g., at regional or central office layer 820), may be represented through the use of linked objects and tag properties.

A Fog network (e.g., established at gateway layer 840) may represent a dense geographical distribution of near-user edge devices (e.g., Fog nodes), equipped with storage capabilities (e.g., to avoid the need to store data in cloud data centers), communication capabilities (e.g., rather than routed over the internet backbone), control capabilities, configuration capabilities, measurement and management capabilities (rather than controlled primarily by network gateways such as those in the LTE core network), among others. In this context, FIG. 8 illustrates a general architecture that integrates a number of MEC and FOG nodes—categorized in different layers (based on their position, connectivity and processing capabilities, etc.). It will be understood, however, that such Fog nodes may be replaced or augmented by edge computing processing nodes.

Fog nodes may be categorized depending on the topology and the layer where they are located. In contrast, from a MEC standard perspective, each Fog node may be considered as a mobile edge (ME) Host, or a simple entity hosting a ME app and a light-weighted ME Platform. In an example, a MEC or Fog node may be defined as an application instance, connected to or running on a device (ME Host) that is hosting a ME Platform. Here, the application consumes MEC services and is associated to a ME Host in the system. The nodes may be migrated, associated to different ME Hosts, or consume MEC services from other (e.g., local or remote) ME platforms.

In contrast to this approach, traditional client, V2V, and other network applications are reliant on remote cloud data storage and processing to exchange and coordinate information. A cloud data arrangement allows for long-term data collection and storage, but is not optimal for highly time varying data, such as a collision, traffic light change, etc. and may fail in attempting to meet latency challenges, such as stopping a vehicle when a child runs into the street. The data message translation techniques discussed herein enable direct communication to occur among devices (e.g., vehicles) in a low-latency manner, using features in existing MEC services that provide minimal overhead.

Depending on the real-time requirements in the applicable communications context, a hierarchical structure of data processing and storage nodes may be defined. For example, including local ultra-low-latency processing, regional storage and processing as well as remote cloud data-center based storage and processing. SLAs, and KPIs, and other measures discussed herein may be used to identify where data is best transferred and where it is processed or stored. This typically depends on the Open Systems Interconnection (OSI) layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

Figure 9:
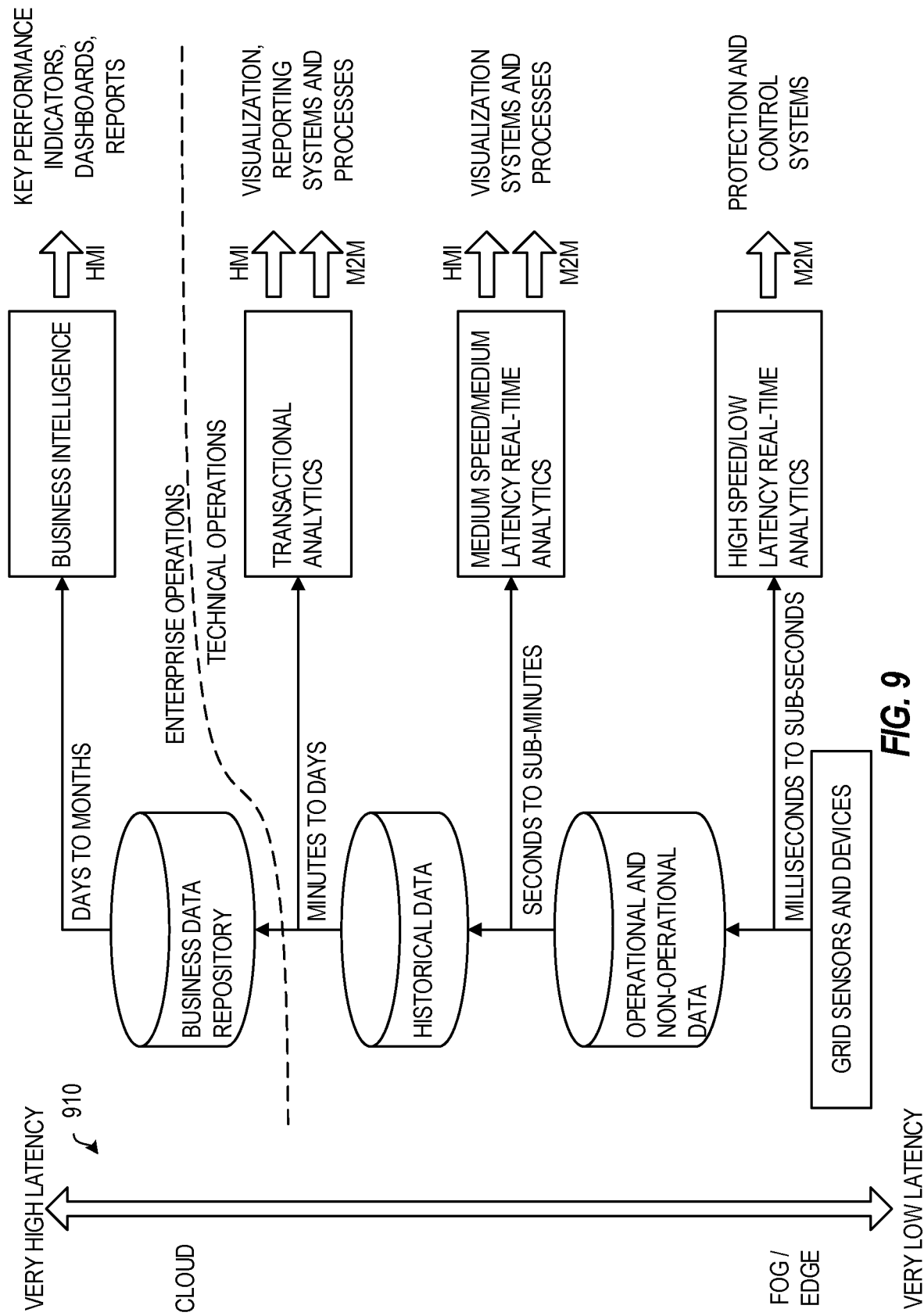
FIG. 9 illustrates processing and storage layers in a MEC and Fog network, according to an example.

FIG. 9 illustrates processing and storage layers in a MEC and Fog network, according to an example. The illustrated data storage or processing hierarchy 910 relative to the cloud and fog/edge networks allows dynamic reconfiguration of elements to meet latency and data processing parameters.

The lowest hierarchy level is on a vehicle-level. This level stores data on past observations or data obtained from other vehicles. The second hierarchy level is distributed storage across a number of vehicles. This distributed storage may change on short notice depending on vehicle proximity to each other or a target location (e.g., near an accident). The third hierarchy level is in a local anchor point, such as a MEC component, carried by a vehicle in order to coordinate vehicles in a pool of cars. The fourth level of hierarchy is storage shared across MEC components. For example, data is shared between distinct pools of vehicles that are in range of each other.

The fifth level of hierarchy is fixed infrastructure storage, such as in RSUs. This level may aggregate data from entities in hierarchy levels 1-4. The sixth level of hierarchy is storage across fixed infrastructure. This level may, for example, be located in the Core Network of a telecommunications network, or an enterprise cloud. Other types of layers and layer processing may follow from this example.

Figure 10:
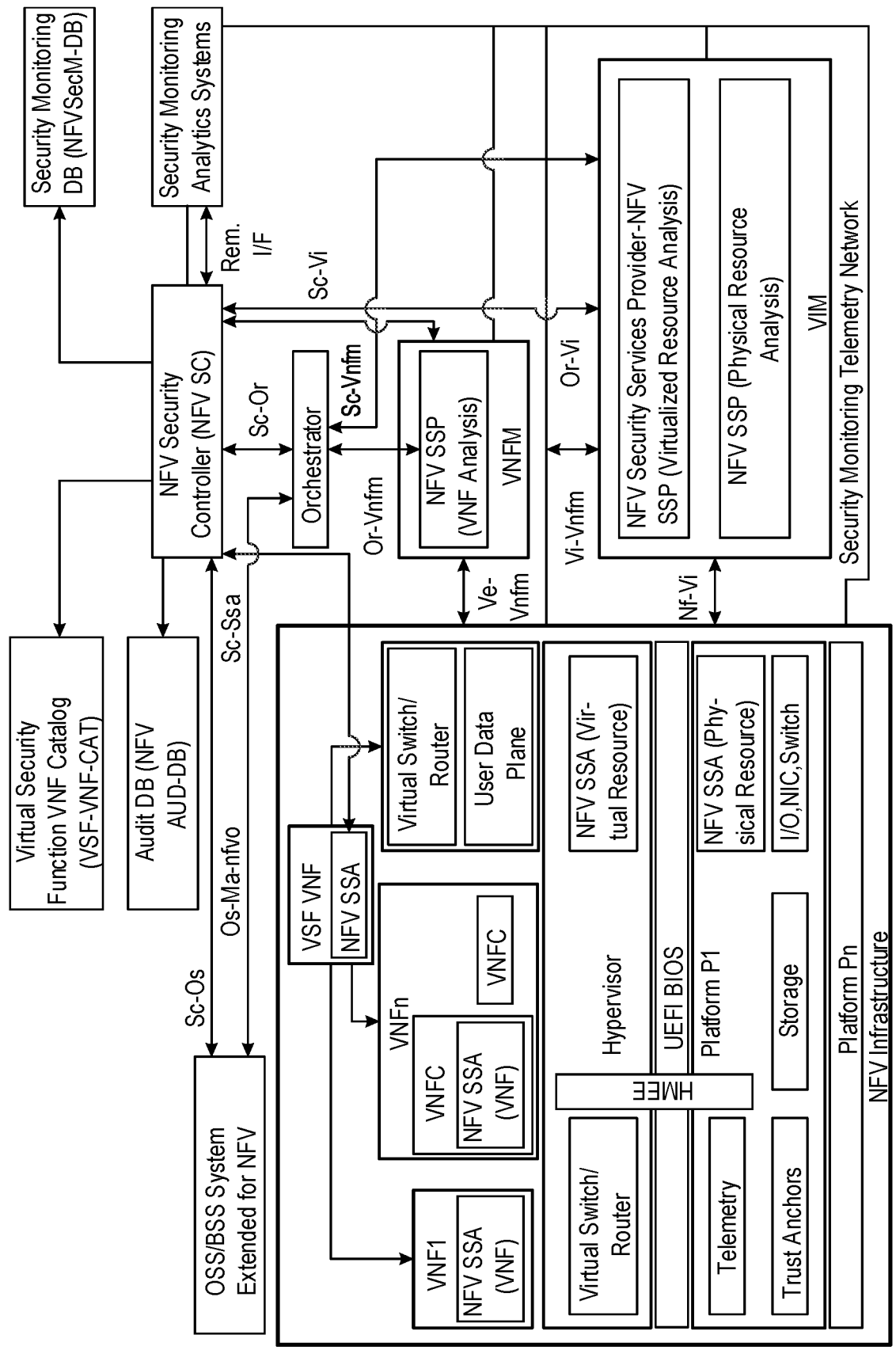
FIG. 10 includes a block diagram for a Network Function Virtualization (NFV) security monitoring and management architecture in which any one or more of the techniques (e.g., operations, processes, methods, and methodologies) discussed herein may be performed, according to an example.

FIG. 10 includes a block diagram for a Network Function Virtualization (NFV) security monitoring and management architecture in which any one or more of the techniques (e.g., operations, processes, methods, and methodologies) discussed herein may be performed. Specifically, in this NFV deployment, security functionality performed by the NFV Security Controller (NFVSC), which serves as a type of security function orchestration, is separated from the application management orchestration performed by an NFV "Orchestrator". FIG. 10 also illustrates a number of interfaces between the NFVSC and other entities including the Orchestrator. The techniques and configurations discussed herein allow management of software update processes within an NFV environment from the perspective of the NFVSC, including the verification of manifests, signatures, credentials, and other attestation and security mechanisms.

With prior approaches, a variety of security issues or vulnerabilities might be exposed as result of software updates. For instance, one example of software update process relevant to network deployments is known as scalable embedded device attestation (SEDA) which allows updating device software to verify whether the update has been performed correctly. In a SEDA architecture, new software comes with a code certificate. After new software has been installed on device Di, the device sends a certificate authenticated with keys in Ki to all its neighbors, which then update their reference software configuration if the verification of certificate was successful. Otherwise, devices maintain the old software configuration. To prove that software update has been performed successfully, the device can either attest itself to all its neighbors using keys or to an external verifier using its secret key. (In this fashion, rollback attacks, where an adversary installs old software versions that may contain exploitable security vulnerabilities, may be detected when attesting the swarm.)

SEDA, like many other update approaches, does not address cryptographic identities (or, IEEE 802.1AR DevIDs), hardware manifests, BIOS image or other keys and policies—rather, only the software image itself is attested. In addition, the SEDA mechanism does not comprehend a more practical situation where a valid firmware/software will have multiple valid rollback versions—especially considering that an operator cannot expect all devices to be updated to the same security version correctly all the time. In addition, there could be multiple race conditions when swarm devices (Dis) decide to update each other. SEDA also does not handle deployments that occur in multi-domain security settings; such a consideration is important because the device software owner, device operator/maintainer, infrastructure (including orchestrator) and network operators are likely to be separate, mutually distrusting entities.

Figure 11:
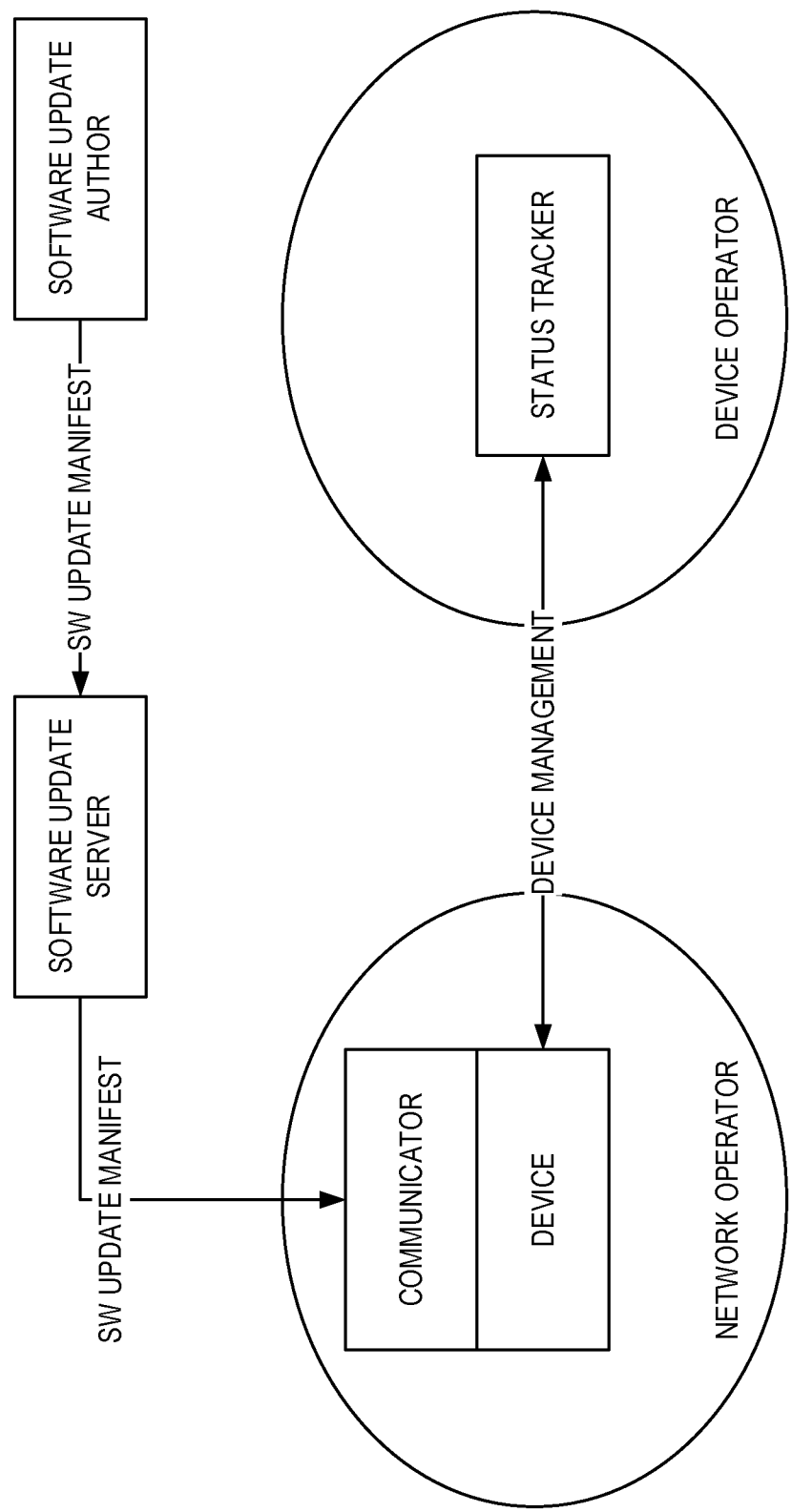
FIG. 11 includes a block diagram for a software update architecture usable in a networked device environment, according to an example.

These and other disadvantages of conventional approaches are addressed by the following techniques and configurations for software update attestation and verification. FIG. 11 includes a block diagram for a software update architecture usable in a networked device environment, adapted with software update attestation and verification features according to the present disclosure. Specifically, the approach of the architecture of FIG. 11 is adapted from the Internet Engineering Task Force (IETF) draft "Firmware Update Architecture for Internet of Things Devices", published July 2018.

In the software update architecture of FIG. 11, when the software update server supplies the software update manifest to the device (e.g., a manifest including a certificate or signature of the software update), the device operator facilitates installation of the update, resulting in an invalid device attestation token. Due this invalid token, subsequent attempts by a peer device to access the device will fail to satisfy token verification.

Figure 12:
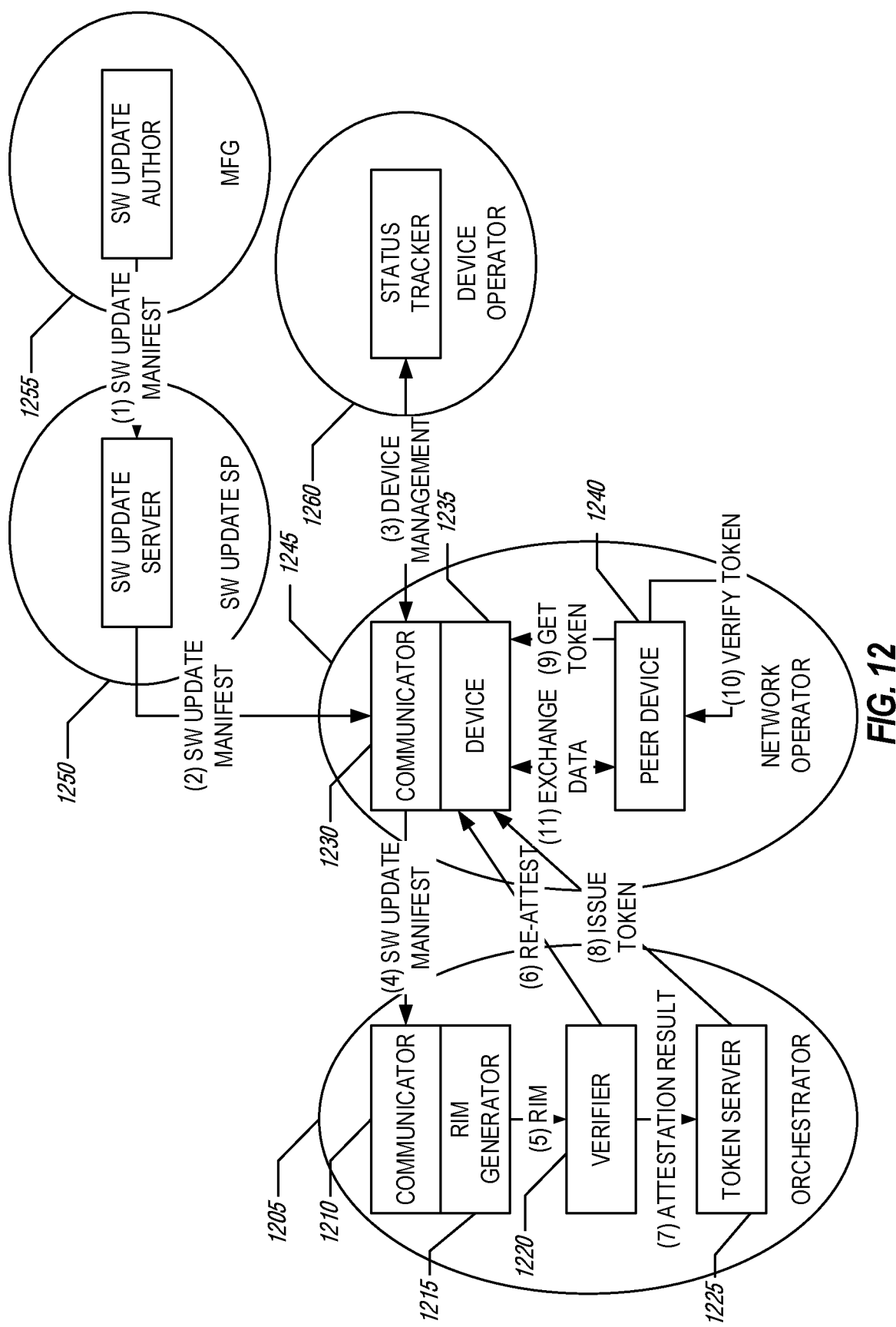
FIG. 12 depicts a block diagram of a software update architecture usable in an orchestrated, multi-domain networked device environment, according to an example.

FIG. 12 depicts a block diagram of a software update architecture (extended from the concepts introduced in FIG. 11) providing an orchestrated, multi-domain networked device environment. Specifically, the architecture of FIG. 12 shows a step-by-step process of re-attestation by an orchestrator 1205 of a device 1235 that has changed due to a software update. Each of the eleven steps involved in this process are noted with respective transactions communicated in FIG. 12.

In the software update architecture of FIG. 12, respective ovals (e.g., the orchestrator 1205, the network operator 1245, software update service provider 1250, manufacturer 1255, and device operator 1260) represent potentially different organizational domains, each having potentially adversarial self-interests. Therefore, all cross-domain interactions may be prefaced by an inter-domain access check. Further, in the example, of FIG. 12, the software update author and software update servers may be owned by separate security domain administrators.

The orchestrator 1205 contains re-attestation functionality, including a Reference Integrity Measurement (RIM) Generator that accepts as input a software update manifest and produces a RIM manifest. Further, the orchestrator 1205 includes a verifier 1220 that accepts as input a RIM manifest and produces an attestation result, after having re-attested the device 1235. In some examples, the features of the orchestrator 1205 may be divided among multiple entities not depicted in FIG. 12 (such as the NFV Orchestrator and NFV Security Controller, as discussed with reference to an NFV environment above).

Further, each domain may identify the messages originating from a different domain for origin authentication as well as specific security access control permissions. The origin authentication may be verified using a mutual authentication protocol, whereas access control permissions may be verified using a combination of authentication tokens with time-bound security credentials (e.g. certificates).

Confidentiality of firmware/software encryption keys may be ensured through use of a hardware-rooted unique private key mechanism. For example, the tokens may be signed with the public component of this private key. Further, this device ID (key) may be integrated into the public key infrastructure (PKI) services of the network owner and software owner, since both entities own the device 1235 in deployment. Such hardware security mechanisms may be provided by Intel® Key Protection Technology (KPT) or other hardware mechanisms.

In some examples, re-attestation may include implicit attestation where the device attestation key is re-generated using a hash of the new software update image to seed a key generation process that produces a new attestation key value. In this case, the verifier 1220 performs an additional role of issuing a new device identity.

Additionally, in some examples, issuance may include using the previous cryptographic identity to sign the new cryptographic identity. This may be accomplished by: Using the current cryptographic identity (KeyA) to sign a hash of the new update image (e.g., sigA=n [sha2(Image)]KeyA); Installing the new update image; Rebooting the new update image (which causes a new cryptographic identity to be formed); and countersign the pre-signed image using the new key (KeyB) (e.g., sigB=[sigA]KeyB).

The verifier 1220 checks the signatures and verifies the image hash matches the expected hash contained in the RIM. If they match, the verifier 1220 issues a new cryptographic identity for the Device 1235 (e.g. issues a certificate containing public KeyB as the identity).

A token server 1225 (or server that provides another attestation-dependent object) accepts an attestation result and issues a new attestation token. When a peer device 1240 interacts with the device 1235, before data is exchanged, the peer device 1240 queries the device 1235 for its attestation token and verifies the token was issued by the token server 1225.

In some examples, where the peer device 1240 and device 1235 are from two different vendors or may be owned by different operators (e.g., in roaming and offload scenarios), an additional check may be needed for authorization (for instance, 3GPP PCRF and AAA). These authorization and security policy checks between different owners may be performed before data can be interchanged and software/firmware updated. If these conditions exist, the orchestrator 1205 may broker a connection to a peer domain's orchestrator to resolve how these additional checks will be applied.

The device operator and orchestrator 1205 may coordinate with the device 1235 to synchronize installation of the software update and re-attestation. This reduces the time window between a valid first attestation token and a valid attestation token issued as a result of the software update. The peer device 1240 may rely on the token server 1225 to either issue tokens that expire quickly so that an invalidated token may not be used to establish communication with the device 1235 or may provide on-line status checking of attestation tokens for so that they may be checked in a timely manner (e.t., near real-time, etc.).

Figure 13:
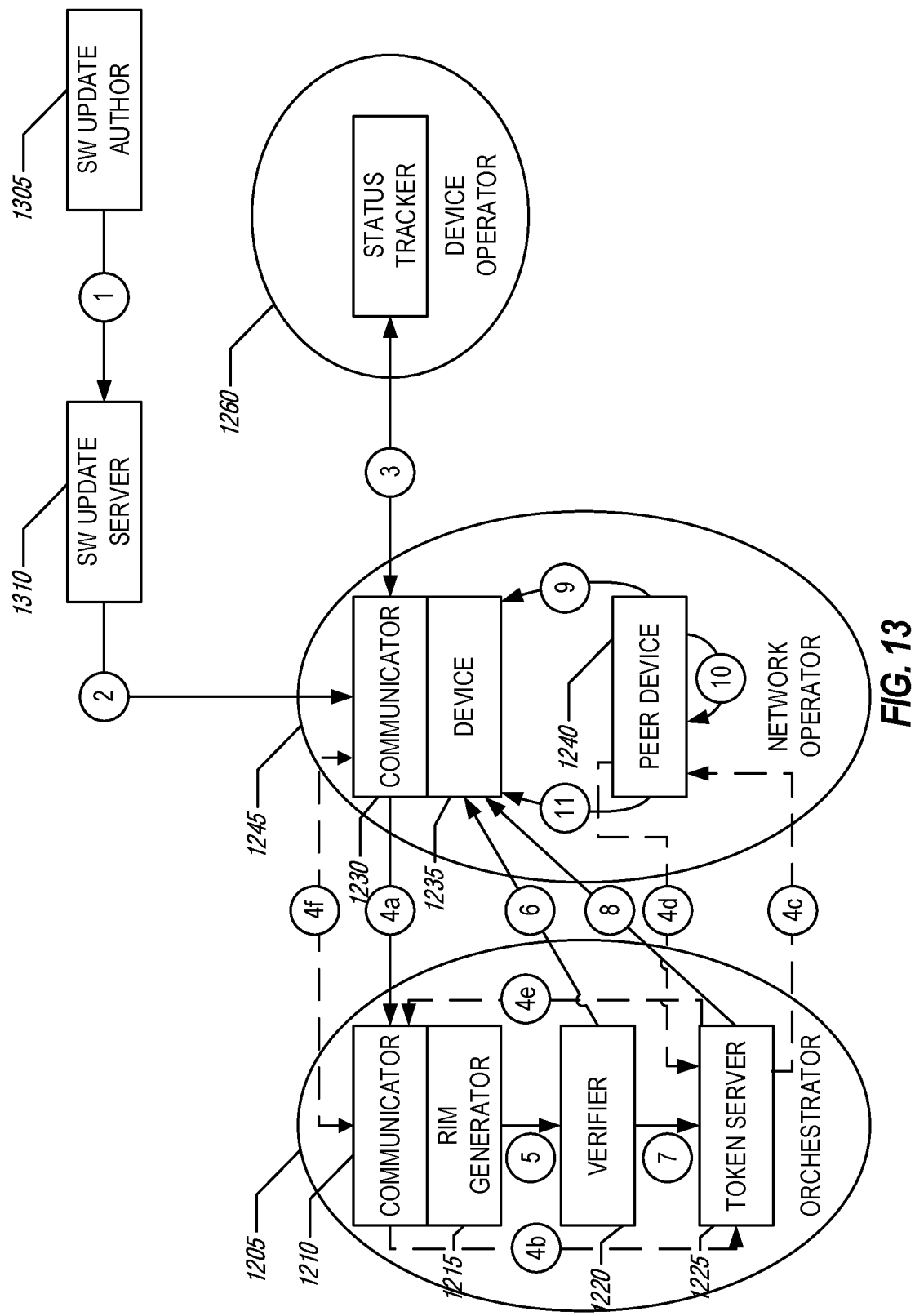
FIG. 13 depicts a block diagram of the software update architecture of FIG. 8, illustrating pre- and post-update coordination operations, according to an example.

Alternatively, the peer device 1240 may register a callback or notification methods with the token server 1225, by which the token server 1225 may provide the peer device 1240 with active indications of attestation tokens that may either become outdated as a result of such reissuance and which may need to be updated. In this case, the operations sketched in FIG. 12 may be altered as shown in the diagram of FIG. 13.

The orchestrator 1205 may obtain a software update package manifest for an edge device (e.g., device 1235). In an example, the edge device may operate in a MEC network according to ETSI MEC standards. The software update package manifest may be transmitted from a device communicator 1230 to the orchestrator communicator 1210. The device communicator 1230 and the orchestrator communicator 1210 may provide network communication functionality for their respective apparatus (e.g., the device 1235 and the orchestrator 1205). In an example, the software update package manifest may be obtained in response to a software update of the edge device.

In an example, it may be identified that the edge device is operating in a different domain. A synchronization channel may be coordinated with the edge device in the different domain and the software update package manifest may be obtained via the synchronization channel In an example, the synchronization channel may be established using a mutual authentication protocol. In another example, the synchronization channel may be established using token and cryptographic key exchange.

The RIM generator 1215 may generate at least one integrity measurement for a software update package associated with the software update package manifest based on the software update package manifest. There may be one or more integrity measurements where multiple measurements may be justified given different hash algorithms and strengths (e.g., SHA1, SHA256, SHA512, etc.). The software update may be security relevant and may include a Security Version Number (SVN) that is incremented when an update has security relevance. A traditional version number may increment for any change to software that results in a different hash value produced. The SVN and a hash of update package may components of the at least one integrity measurement. The software update package may contain additional information about the software including a version number and/or SVN such that the hash reflects changes in these values in addition to software image changes.

The verifier 1220 may initiate an attestation request with the edge device. The verifier may verify the edge device based on the at least one integrity measurement and the result (e.g., a response received with valid attestation information, etc.) of the attestation request. In an example, an attestation key may be generated for the edge device based on a hash of the software update package manifest and verification of the edge device may include use of the attestation key.

In another example, a new device cryptographic identity may be generated for the edge device. The new device cryptographic identity may be signed using a certificate corresponding to a current device cryptographic identity. The new device cryptography identity may be transmitted to the edge device and verification of the edge device may include use of the new device cryptography identity. In an example, the software update package associated with the software update package manifest may be transmitted to the edge device. A reset of the edge device may be initiated, and the new device cryptography identity may be counter-signed with a new key generated in response to the reset of the edge device.

An attestation record may be generated for the edge device based on the verification. In an example, the attestation record may be a token issued to the edge device by the token server 1225 based on the verification. The token may contain the SVN, version or other attribute to describe the status of the software update and its current operational status such that a consumer of the token (e.g., peer device 1240, etc.) may inspect the various additional values to compare to policies directing access control and/or risk management processes affected. In another example, an attestation manifest for the edge device may be updated based on the software update package manifest.

FIG. 13 depicts a block diagram of the software update architecture of FIG. 12, illustrating pre- and post-update coordination operations, according to an example. In FIG. 13, step 4 (depicted in FIG. 12) is split into steps 4a-4e by which peer devices that have registered for active indication of re-attestation are informed before software update proceeds in step 4f; and, if step 4f is successful, then the remaining steps 5-11 shown in FIG. 12 continue. If step 4f is not successful, the software update is retracted, and the peer devices may later perform steps 9 and 10 to obtain and verify the pre-update tokens (which apply as the update was undone). If attestation token verification succeeds, the peer device knows it is safe to request services or exchange data with the device.

FIG. 13 specifically illustrates the following sequence of operations:

Step 1: Software author 1305 sends software update manifest

Step 2: Software update server 1310 sends the manifest (e.g., for receipt by the device communicator 1230)

Step 3: Device operator 1260 initiates update coordination (e.g., via the device communicator 1230)

Step 4a: Orchestrator 1205 and network operator 1245 initiate coordination (e.g., via the device communicator 1230 and the orchestrator communicator 1210)

Step 4b: Token server 1225 informed of pending update

Step 4c: Token server 1225 contacts peer devices (e.g., peer device 1240, etc.) that requested revalidation trigger (or callback)

Step 4d: Peer devices (e.g., peer device 1240, etc.) or their trust agents acknowledge revalidation trigger Step 4e: Orchestrator 1205 informed of completion of pre-update revalidation notifications (e.g., by token server 1225 via the orchestrator communicator 1215)

Step 4f: Software update proceeds (e.g., as indicated by communications between the orchestrator communicator 1210 and the device communicator 1230), and if not successful, after designated number of retries, pre-update version restored. Assuming update succeeds, proceed with steps 5-11.

Step 5: RIM generation (e.g., by the RIM generator 1215)

Step 6: Re-attestation proceeds (e.g., via communications (e.g., attestation request-response pairs, etc.) between the verifier 1220 and the device 1235)

Step 7: Attestation result sent (e.g., by the verifier 1220) to Token Server 1225

Step 8: Token issued (e.g., by the token server 1225)

Step 9: Peer device 1240 contacts and receives token (e.g., from the device 1235)

Step 10: Peer device 1240 validates/verifies token

Step 11: Data exchange or services proceed with trust (e.g., between the peer device 1240 and the device 1235)

Figure 14:
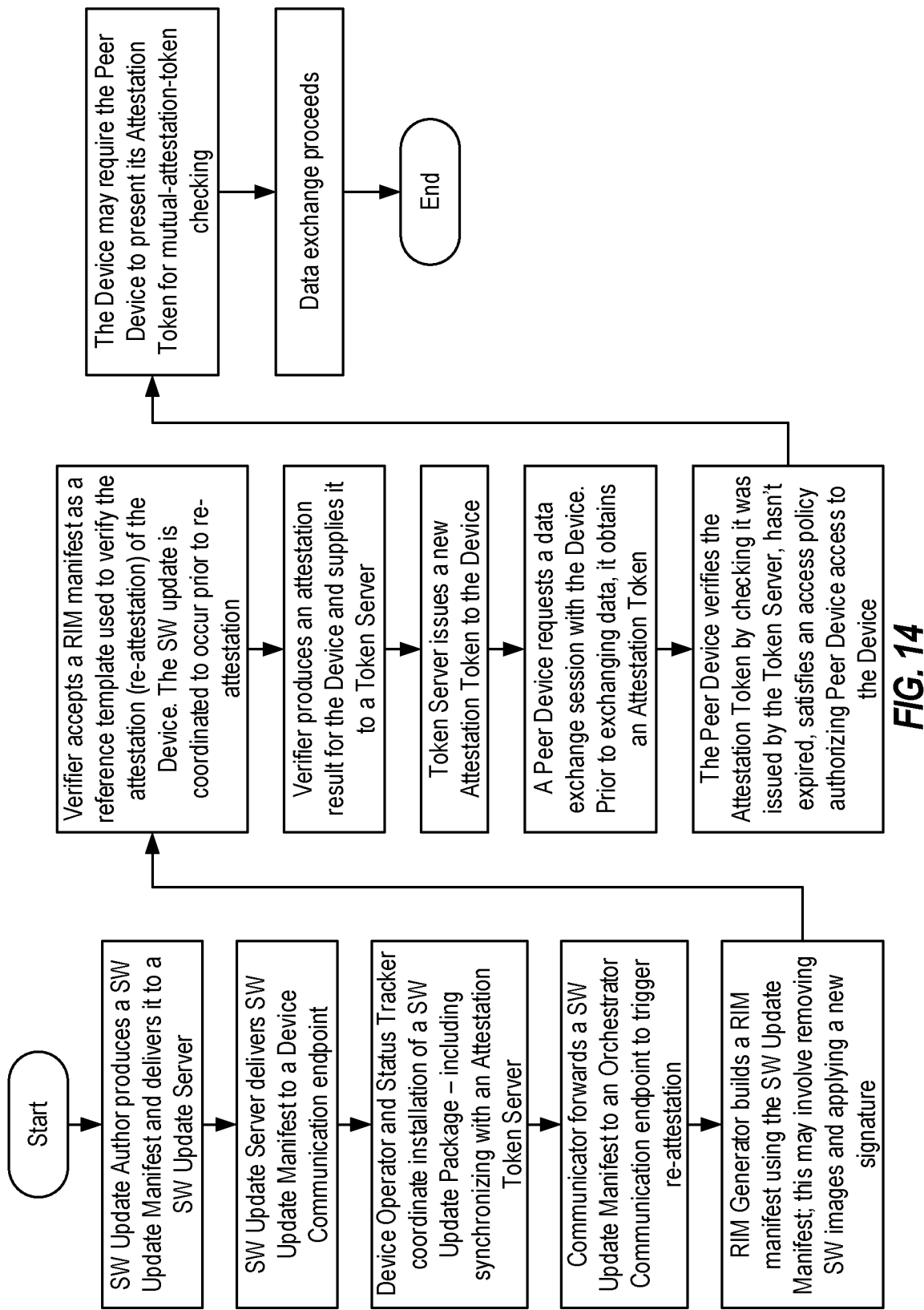
FIG. 14 depicts a flowchart of the software update and coordination operations referenced in FIGS. 12 and 13, according to an example.

FIG. 14 depicts a flowchart of the software update and coordination operations referenced in FIGS. 12 and 13. In this example flow, software update manifests can be used to dynamically generate RIMs (Reference Integrity Manifests) where installation of the update triggers re-issuance of an attestation token or other authenticating object. This token or other authenticating object may be used to capture attestation status such that the token (status) is automatically updated to facilitate system availability without compromising operational integrity. Re-attestation is coordinated with pre- and post-software image update so that attestation tokens are synchronized with the appropriate installed software image.

In an example, the RIM and software update package contains hardware platform dependencies (that are prerequisites for software/firmware update operations). These dependencies may be included in an attestation or re-attestation check. Re-attestation may include re-issuance of the device cryptographic identity.

Figure 15:
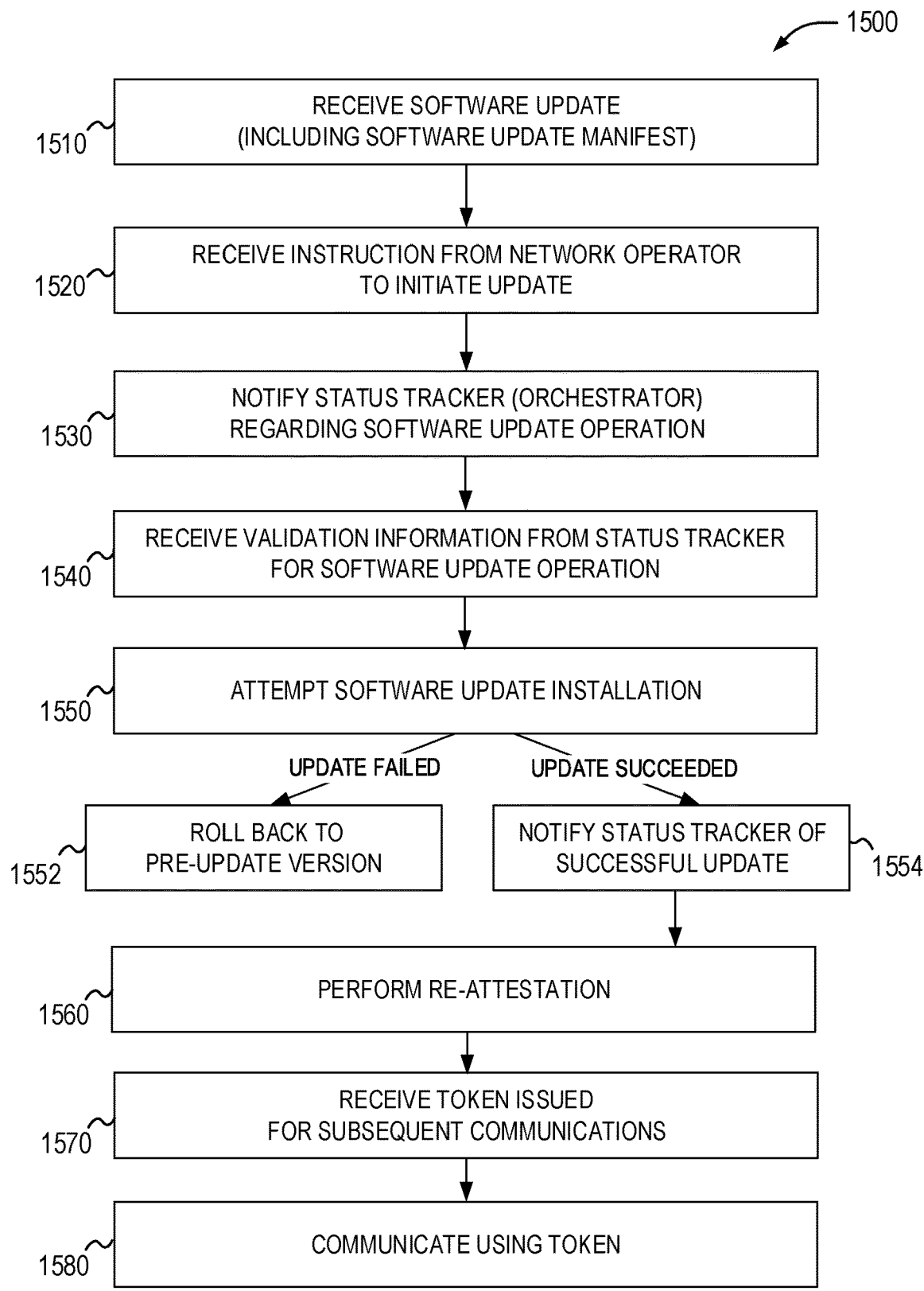
FIG. 15 depicts a flowchart of an example process for endpoint software update validation, according to an example.

FIG. 15 depicts a flowchart 1500 of an example process for endpoint software update validation, according to an example. The following process is depicted from the perspective of a computing system (e.g., an endpoint device) operated by an entity (e.g., a network operator) to perform network communication operations in connection with a software update process. However, the following operations may be performed by other entities or systems. Further, although reference is provided in the following steps to a software update, these steps may also be performed in connection with a firmware update.

Step 1510: Receive a software update, including the software manifest

Step 1520: Receive an instruction from network operator to initiate the software update Step 1530: Notify the status tracker (e.g., an orchestrator) regarding the software update operation, including providing information regarding the update (such as the manifest)

Step 1540: Receive validation information from the status tracker for the software update operation Step 1550: Attempt software update installation Step 1552: If the software update fails, roll back to a pre-update version Step 1554: If the software update succeeds, notify the status tracker of the successful update Step 1560: Perform re-attestation of the device, based on the updated device state provided from the software update Step 1570: Receive a token issued for subsequent communications Step 1580: Communicate with other devices using the issued token Other variations to the preceding procedures and interfaces will be apparent from the examples above.

Figure 16:
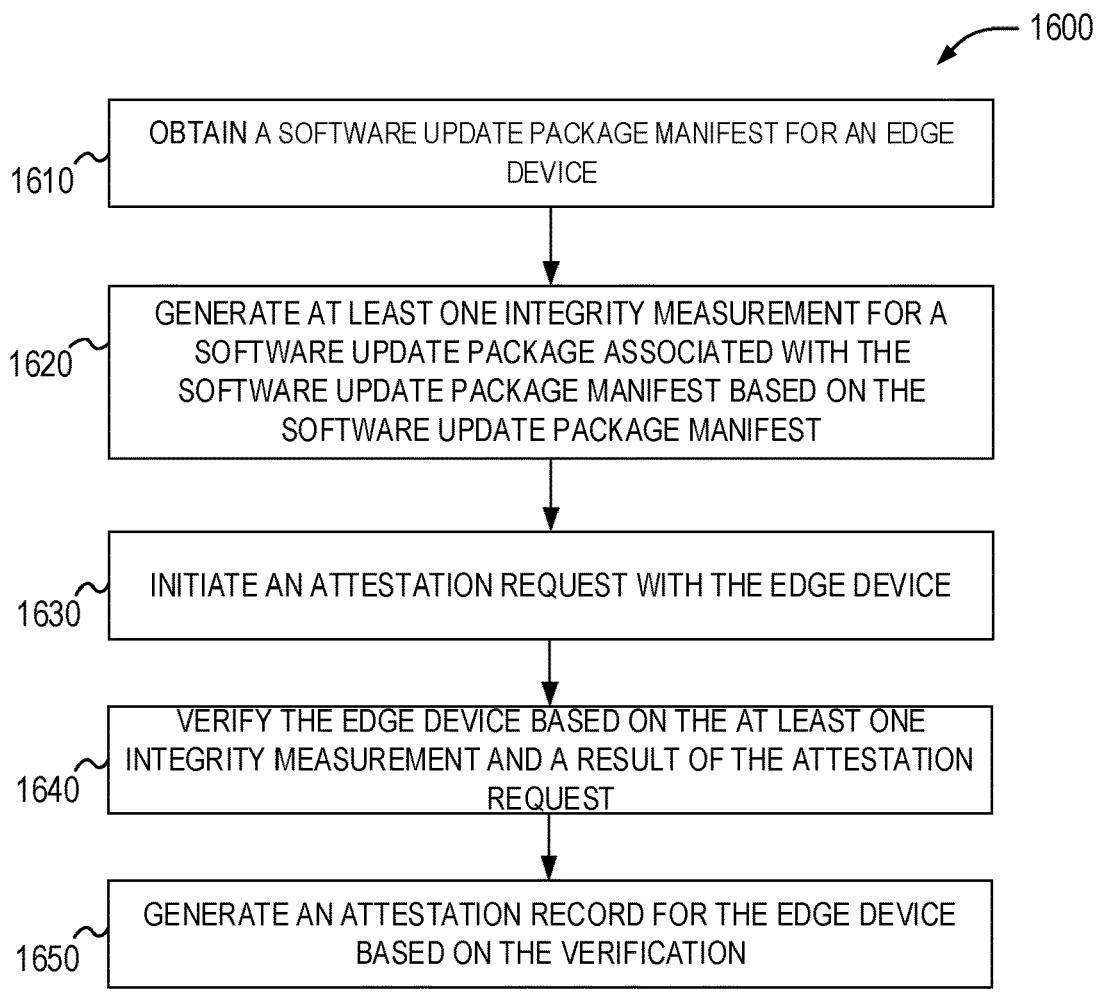
FIG. 16 depicts a flowchart of an example method for endpoint software update validation by an orchestrator, according to an example.

FIG. 16 depicts a flowchart 1600 of an example method for endpoint software update validation by an orchestrator, according to an example. The flowchart 1600 may provide features as described in FIGS. 12-15.

A software update package manifest may be obtained (e.g., by the orchestrator 1205 as described in FIG. 12, etc.) for an edge device (e.g., device 1235 as described in FIG. 12) (e.g., at operation 1610). Edge devices may include, for example, sensors, actuators, endpoints, IoT gateways, routers, switches, etc. In an example, the edge device may operate in a multi-access edge computing (MEC) network according to European Telecommunications Standard Institute (ETSI) MEC standards. In an example, the software update package manifest may be obtained in response to a software update of the edge device.

In an example, it may be identified that the edge device is operational in a different domain A synchronization channel may be coordinated with the edge device in the different domain and the software update package manifest may be obtained via the synchronization channel In an example, the synchronization channel may be established using a mutual authentication protocol. In another example, the synchronization channel may be established using token and cryptographic key exchange.

At least one integrity measurement may be generated (e.g., by the RIM generator 1215 as described in FIG. 12, etc.) for a software update package associated with the software update package manifest based on the software update package manifest (e.g., at operation 1620). An attestation request may be initiated (e.g., by the verifier 1220 as described in FIG. 12, etc.) with the edge device (e.g., at operation 1630). The edge device may be verified (e.g., by the verifier 1220 as described in FIG. 12, etc.) based on the at least one integrity measurement and the result (e.g., a response received with valid attestation information, etc.) of the attestation request (e.g., at operation 1640). In an example, an attestation key may be generated for the edge device based on a hash of the software update package manifest and verification of the edge device may include use of the attestation key.

In another example, a new device cryptographic identity may be generated for the edge device. The new device cryptographic identity may be signed using a certificate corresponding to a current device cryptographic identity. The new device cryptography identity may be transmitted to the edge device and verification of the edge device may include use of the new device cryptography identity. In an example, the software update package associated with the software update package manifest may be transmitted to the edge device. A reset of the edge device may be initiated, and the new device cryptography identity may be counter-signed with a new key generated in response to the reset of the edge device.

An attestation record may be generated for the edge device based on the verification (e.g., at operation 1650). In an example, a token may be issued (e.g., by the token server 1225 as described in FIG. 12, etc.) to the edge device based on the verification. In another example, an attestation manifest for the edge device may be updated based on the software update package manifest.

Figure 17:
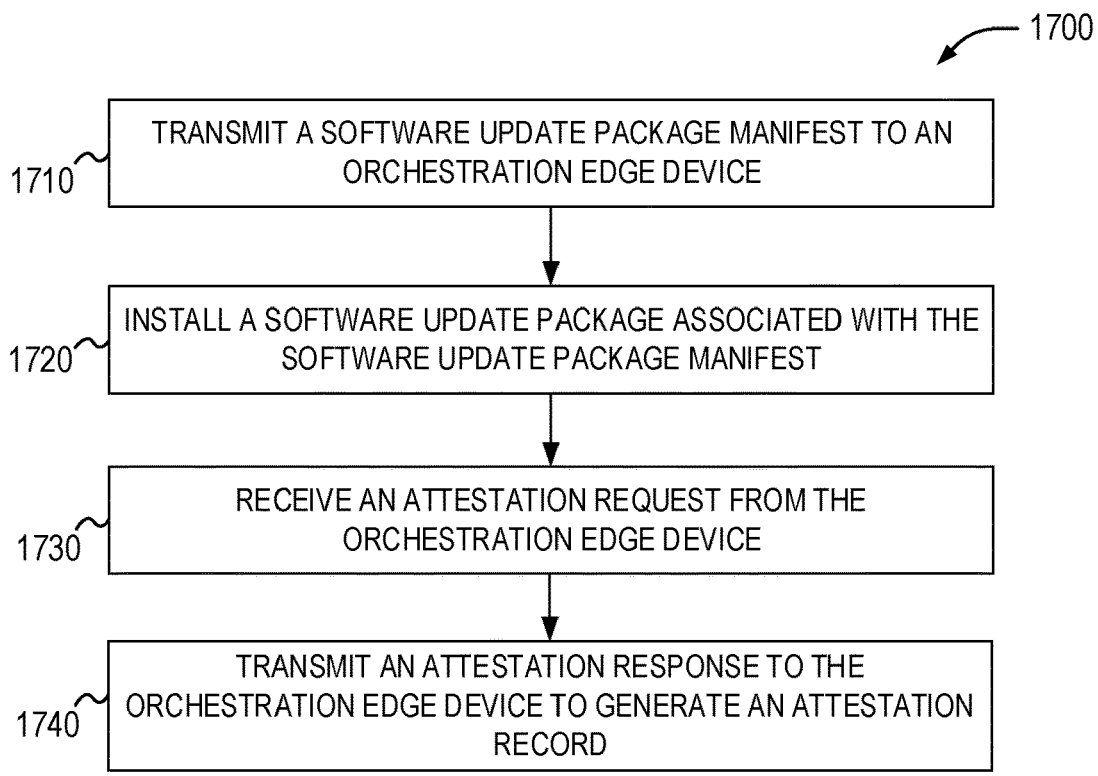
FIG. 17 depicts a flowchart of an example method for endpoint software update validation, according to an example.

FIG. 17 depicts a flowchart 1700 of an example method for endpoint software update validation, according to an example. The flowchart 1700 may provide features as described in FIGS. 12-16.

A software update package manifest may be transmitted (e.g., by the device 1235 as described in FIG. 12, etc.) to an orchestration edge device (e.g., the orchestrator 1205 as described in FIG. 12, etc.) (e.g., at operation 1710). In an example, the software update package and the software update package manifest may be received from a software update server.

A software update package may be installed that is associated with the software update package manifest (e.g., at operation 1720). In an example, a reset operation may be initiated upon completion of installation of the software update package and receipt of a reset command from the orchestration edge device. A new key may be generated in response to the reset operation. A new device cryptographic identity may be received that is counter-signed using the new key. In an example, the new device identity may be received from the orchestration edge device and the new device identity may be signed using a current device cryptographic identity.

An attestation request may be received from the orchestration edge device (e.g., at operation 1730). An attestation response may be transmitted to the orchestration edge device to generate an attestation record (e.g., at operation 1740). In an example, communication with an edge device on an edge device network may be established using the attestation record. In an example, the attestation response may include the new device cryptographic identity.

Implementation of the preceding techniques may be accomplished through any number of specifications, configurations, or example deployments of hardware and software. It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the non-limiting examples may stand on its own, or may be combined in any permutation or combination with any one or more of the other examples provided below or throughout the present disclosure.

Example 1 is a method for attestation manifest derivation and distribution by an edge device orchestrator, the method comprising: obtaining a software update package manifest for an edge device; generating at least one integrity measurement for a software update package associated with the software update package manifest based on the software update package manifest; initiating an attestation request with the edge device; verifying the edge device based on the at least one integrity measurement and a result of the attestation request; and generating an attestation record for the edge device based on the verification.

In Example 2, the subject matter of Example 1 includes, subject matter where the edge device operates in a multi-access edge computing (MEC) network according to European Telecommunications Standard Institute (ETSI) MEC standards.

In Example 3, the subject matter of Examples 1-2 includes, generating an attestation key for the edge device based on a hash of the software update package manifest, wherein verifying the edge device includes use of the attestation key.

In Example 4, the subject matter of Example 3 includes, subject matter where the software update package manifest includes additional information about a software update package corresponding to the software update package manifest including a security version number, and wherein the hash reflects changes in the security version number.

In Example 5, the subject matter of Examples 1-4 includes, generating a new device cryptographic identity for the edge device; signing the new device cryptographic identity using a certificate corresponding to a current device cryptographic identity; and transmitting the new device cryptography identity to the edge device, wherein verifying the edge device includes use of the new device cryptography identity.

In Example 6, the subject matter of Example 5 includes, transmitting the software update package associated with the software update package manifest to the edge device; initiating a reset of the edge device; and counter-signing the new device cryptography identity with a new key generated in response to the reset of the edge device.

In Example 7, the subject matter of Examples 1-6 includes, issuing a token to the edge device based on the verification.

In Example 8, the subject matter of Example 7 includes, subject matter where the token includes an attribute to describe the status of a software update package corresponding to the software update package manifest.

In Example 9, the subject matter of Example 8 includes, subject matter where the attribute is a security version number corresponding to the software update package.

In Example 10, the subject matter of Example 9 includes, subject matter where the token is provided to a consumer for inspection of an operational status of the software update package based on the security version number.

In Example 11, the subject matter of Examples 1-10 includes, updating an attestation manifest for the edge device based on the software update package manifest.

In Example 12, the subject matter of Examples 1-11 includes, identifying that the edge device is in a different domain; coordinating a synchronization channel with the edge device in the different domain, wherein the software update package manifest is obtained via the synchronization channel.

In Example 13, the subject matter of Example 12 includes, subject matter where the synchronization channel is established using a mutual authentication protocol.

In Example 14, the subject matter of Examples 12-13 includes, subject matter where the synchronization channel is established using token and cryptographic key exchange.

In Example 15, the subject matter of Examples 1-14 includes, subject matter where the software update package manifest is obtained in response to a software update of the edge device.

In Example 16, the subject matter of Examples 1-15 includes, subject matter where the at least one integrity measurement includes a set of integrity measurements, wherein each integrity measurement of the set of integrity measurements corresponds to a respective hash algorithm.

Example 17 is a system to implement attestation manifest derivation and distribution, the system comprising means to perform any method of Examples 1-16.

Example 18 is at least one machine-readable medium to implement attestation manifest derivation and distribution, the at least one machine readable medium including instructions that, when executed by a machine, cause the machine to perform any method of Examples 1-16.

Example 19 is an orchestration apparatus for attestation manifest derivation and distribution, the orchestration apparatus comprising: processing circuitry; and memory including instructions that, when executed by the processing circuitry, cause the processing circuitry to perform operations to: obtain a software update package manifest from an edge device; generate at least one integrity measurement for a software update package associated with the software update package manifest based on the software update package manifest; initiate an attestation request with the edge device; verify the edge device based on the at least one integrity measurement and a result of the attestation request; and generate an attestation record for the edge device based on the verification.

In Example 20, the subject matter of Example 19 includes, subject matter where the edge device operates in a multi-access edge computing (MEC) network according to European Telecommunications Standard Institute (ETSI) MEC standards.

In Example 21, the subject matter of Examples 19-20 includes, the memory further comprising instructions that, when executed by the processing circuitry, cause the processing circuitry to perform operations to generate an attestation key for the edge device based on a hash of the software update package manifest, wherein verification of the edge device includes use of the attestation key.

In Example 22, the subject matter of Example 21 includes, subject matter where the software update package manifest includes additional information about a software update package that corresponds to the software update package manifest and includes a security version number, and wherein the hash reflects changes in the security version number.

In Example 23, the subject matter of Examples 19-22 includes, the memory further comprising instructions that, when executed by the processing circuitry, cause the processing circuitry to perform operations to: generate a new device cryptographic identity for the edge device; sign the new device cryptographic identity with a certificate corresponding to a current device cryptographic identity; and transmit the new device cryptography identity to the edge device, wherein verification of the edge device includes use of the new device cryptography identity.

In Example 24, the subject matter of Example 23 includes, the memory further comprising instructions that, when executed by the processing circuitry, cause the processing circuitry to perform operations to: transmit the software update package associated with the software update package manifest to the edge device; initiate a reset of the edge device; and counter-sign the new device cryptography identity with a new key generated in response to the reset of the edge device.

In Example 25, the subject matter of Examples 19-24 includes, the memory further comprising instructions that, when executed by the processing circuitry, cause the processing circuitry to perform operations to issue a token to the edge device based on the verification.

In Example 26, the subject matter of Example 25 includes, subject matter where the token includes an attribute to describe the status of a software update package that corresponds to the software update package manifest.

In Example 27, the subject matter of Example 26 includes, subject matter where the attribute is a security version number that corresponds to the software update package.

In Example 28, the subject matter of Example 27 includes, subject matter where the token is provided to a consumer for inspection of an operational status of the software update package based on the security version number.

In Example 29, the subject matter of Examples 19-28 includes, the memory further comprising instructions that, when executed by the processing circuitry, cause the processing circuitry to perform operations to update an attestation manifest for the edge device based on the software update package manifest.

In Example 30, the subject matter of Examples 19-29 includes, the memory further comprising instructions that, when executed by the processing circuitry, cause the processing circuitry to perform operations to: identify that the edge device is in a different domain; coordinate a synchronization channel with the edge device in the different domain, wherein the software update package manifest is obtained via the synchronization channel.

In Example 31, the subject matter of Example 30 includes, subject matter where the synchronization channel is established via a mutual authentication protocol.

In Example 32, the subject matter of Examples 30-31 includes, subject matter where the synchronization channel is established via token and cryptographic key exchange.

In Example 33, the subject matter of Examples 19-32 includes, subject matter where the software update package manifest is obtained in response to a software update of the edge device.

In Example 34, the subject matter of Examples 19-33 includes, subject matter where the at least one integrity measurement includes a set of integrity measurements, wherein each integrity measurement of the set of integrity measurements corresponds to a respective hash algorithm.

Example 35 is at least one non-transitory machine-readable medium including instructions for attestation manifest derivation and distribution that, when executed by processing circuitry, cause the processing circuitry to perform operations to: obtain a software update package manifest from an edge device; generate at least one integrity measurement for a software update package associated with the software update package manifest based on the software update package manifest; initiate an attestation request with the edge device; verify the edge device based on the at least one integrity measurement and a result of the attestation request; and generate an attestation record for the edge device based on the verification.

In Example 36, the subject matter of Example 35 includes, subject matter where the edge device operates in a multi-access edge computing (MEC) network according to European Telecommunications Standard Institute (ETSI) MEC standards.

In Example 37, the subject matter of Examples 35-36 includes, instructions that, when executed by the processing circuitry, cause the processing circuitry to perform operations to generate an attestation key for the edge device based on a hash of the software update package manifest, wherein verification of the edge device includes use of the attestation key.

In Example 38, the subject matter of Example 37 includes, subject matter where the software update package manifest includes additional information about a software update package that corresponds to the software update package manifest and includes a security version number, and wherein the hash reflects changes in the security version number.

In Example 39, the subject matter of Examples 35-38 includes, instructions that, when executed by the processing circuitry, cause the processing circuitry to perform operations to: generate a new device cryptographic identity for the edge device; sign the new device cryptographic identity with a certificate corresponding to a current device cryptographic identity; and transmit the new device cryptography identity to the edge device, wherein verification of the edge device includes use of the new device cryptography identity.

In Example 40, the subject matter of Example 39 includes, instructions that, when executed by the processing circuitry, cause the processing circuitry to perform operations to: transmit the software update package associated with the software update package manifest to the edge device; initiate a reset of the edge device; and counter-sign the new device cryptography identity with a new key generated in response to the reset of the edge device.

In Example 41, the subject matter of Examples 35-40 includes, instructions that, when executed by the processing circuitry, cause the processing circuitry to perform operations to issue a token to the edge device based on the verification.

In Example 42, the subject matter of Example 41 includes, subject matter where the token includes an attribute to describe the status of a software update package that corresponds to the software update package manifest.

In Example 43, the subject matter of Example 42 includes, subject matter where the attribute is a security version number that corresponds to the software update package.

In Example 44, the subject matter of Example 43 includes, subject matter where the token is provided to a consumer for inspection of an operational status of the software update package based on the security version number.

In Example 45, the subject matter of Examples 35-44 includes, instructions that, when executed by the processing circuitry, cause the processing circuitry to perform operations to update an attestation manifest for the edge device based on the software update package manifest.

In Example 46, the subject matter of Examples 35-45 includes, instructions that, when executed by the processing circuitry, cause the processing circuitry to perform operations to: identify that the edge device is in a different domain; coordinate a synchronization channel with the edge device in the different domain, wherein the software update package manifest is obtained via the synchronization channel.

In Example 47, the subject matter of Example 46 includes, subject matter where the synchronization channel is established via a mutual authentication protocol.

In Example 48, the subject matter of Examples 46-47 includes, subject matter where the synchronization channel is established via token and cryptographic key exchange.

In Example 49, the subject matter of Examples 35-48 includes, subject matter where the software update package manifest is obtained in response to a software update of the edge device.

In Example 50, the subject matter of Examples 35-49 includes, subject matter where the at least one integrity measurement includes a set of integrity measurements, wherein each integrity measurement of the set of integrity measurements corresponds to a respective hash algorithm.

Example 51 is a system for attestation manifest derivation and distribution, the system comprising: means for obtaining a software update package manifest from an edge device; means for generating at least one integrity measurement for a software update package associated with the software update package manifest based on the software update package manifest; means for initiating an attestation request with the edge device; means for verifying the edge device based on the at least one integrity measurement and a result of the attestation request; and means for generating an attestation record for the edge device based on the verification. In a specific example, the means for obtaining, generating, initiating, and verifying may be implemented by the device 650 through the examples of processing circuitry and communications circuitry as discussed above.

In Example 52, the subject matter of Example 51 includes, subject matter where the edge device operates in a multi-access edge computing (MEC) network according to European Telecommunications Standard Institute (ETSI) MEC standards.

In Example 53, the subject matter of Examples 51-52 includes, means for generating an attestation key for the edge device based on a hash of the software update package manifest, wherein verifying the edge device includes use of the attestation key. In a specific example, the means for generating may be implemented by the device 650 through the examples of processing circuitry and communications circuitry as discussed above.

In Example 54, the subject matter of Example 53 includes, subject matter where the software update package manifest includes additional information about a software update package corresponding to the software update package manifest including a security version number, and wherein the hash reflects changes in the security version number.

In Example 55, the subject matter of Examples 51-54 includes, means for generating a new device cryptographic identity for the edge device; means for signing the new device cryptographic identity using a certificate corresponding to a current device cryptographic identity; and means for transmitting the new device cryptographic identity to the edge device, wherein verifying the edge device includes use of the new device cryptography identity. In a specific example, the means for generating, signing, and transmitting may be implemented by the device 650 through the examples of processing circuitry and communications circuitry as discussed above.

In Example 56, the subject matter of Example 55 includes, means for transmitting the software update package associated with the software update package manifest to the edge device; means for initiating a reset of the edge device; and means for counter-signing the new device cryptography identity with a new key generated in response to the reset of the edge device. In a specific example, the means for transmitting, initiating, and counter-signing may be implemented by the device 650 through the examples of processing circuitry and communications circuitry as discussed above.

In Example 57, the subject matter of Examples 51-56 includes, means for issuing a token to the edge device based on the verification. In a specific example, the means for issuing may be implemented by the device 650 through the examples of processing circuitry and communications circuitry as discussed above.

In Example 58, the subject matter of Example 57 includes, subject matter where the token includes an attribute to describe the status of a software update package corresponding to the software update package manifest.

In Example 59, the subject matter of Example 58 includes, subject matter where the attribute is a security version number corresponding to the software update package.

In Example 60, the subject matter of Example 59 includes, subject matter where the token is provided to a consumer for inspection of an operational status of the software update package based on the security version number.

In Example 61, the subject matter of Examples 51-60 includes, means for updating an attestation manifest for the edge device based on the software update package manifest. In a specific example, the means for updating may be implemented by the device 650 through the examples of processing circuitry and communications circuitry as discussed above.

In Example 62, the subject matter of Examples 51-61 includes, means for identifying that the edge device is in a different domain; means for coordinating a synchronization channel with the edge device in the different domain, wherein the software update package manifest is obtained via the synchronization channel In a specific example, the means for identifying and coordinating may be implemented by the device 650 through the examples of processing circuitry and communications circuitry as discussed above.

In Example 63, the subject matter of Example 62 includes, subject matter where the synchronization channel is established using a mutual authentication protocol.

In Example 64, the subject matter of Examples 62-63 includes, subject matter where the synchronization channel is established using token and cryptographic key exchange.

In Example 65, the subject matter of Examples 51-64 includes, subject matter where the software update package manifest is obtained in response to a software update of the edge device.

In Example 66, the subject matter of Examples 51-65 includes, subject matter where the at least one integrity measurement includes a set of integrity measurements, wherein each integrity measurement of the set of integrity measurements corresponds to a respective hash algorithm.

Example 67 is a method for attestation manifest derivation and distribution, the method comprising: transmitting a software update package manifest to an orchestration edge device; installing a software update package associated with the software update package manifest; receiving an attestation request from the orchestration edge device; and transmitting an attestation response to the orchestration edge device to generate an attestation record.

In Example 68, the subject matter of Example 67 includes, communicating with an edge device on an edge device network using the attestation record.

In Example 69, the subject matter of Examples 67-68 includes, receiving the software update package and the software update package manifest from a software update server.

In Example 70, the subject matter of Examples 67-69 includes, subject matter where the installation of the software update package is based receipt of an installation command from the orchestration edge device and further comprising: initiating a reset operation upon completion of installation of the software update package and receipt of a reset command from the orchestration edge device; generating a new key in response to the reset operation; receiving a new device cryptographic identity counter-signed using the new key, wherein the attestation response includes the new device cryptographic identity.

In Example 71, the subject matter of Example 70 includes, receiving the new device identity from the orchestration edge device, wherein the new device identity is signed using a current device cryptographic identity.

Example 72 is a system to implement attestation manifest derivation and distribution, the system comprising means to perform any method of Examples 67-71.

Example 73 is at least one machine-readable medium to implement attestation manifest derivation and distribution, the at least one machine readable medium including instructions that, when executed by a machine, cause the machine to perform any method of Examples 67-71.

Example 74 is an edge computing device for attestation manifest derivation and distribution, the mobile computing device comprising: processing circuitry; and memory including instructions that, when executed by the processing circuitry, cause the processing circuitry to perform operations to: transmit a software update package manifest to an orchestration edge device; install a software update package associated with the software update package manifest; receive an attestation request from the orchestration edge device; and transmit an attestation response to the orchestration edge device to generate an attestation record.

In Example 75, the subject matter of Example 74 includes, the memory further comprising instructions that, when executed by the processing circuitry, cause the processing circuitry to perform operations to communicate with an edge device on an edge device network using the attestation record.

In Example 76, the subject matter of Examples 74-75 includes, the memory further comprising instructions that, when executed by the processing circuitry, cause the processing circuitry to perform operations to receive the software update package and the software update package manifest from a software update server.

In Example 77, the subject matter of Examples 74-76 includes, subject matter where the installation of the software update package is based receipt of an installation command from the orchestration edge device and the memory further comprising instructions that, when executed by the processing circuitry, cause the processing circuitry to perform operations to: initiate a reset operation upon completion of installation of the software update package and receipt of a reset command from the orchestration edge device; generate a new key in response to the reset operation; receive a new device cryptographic identity counter-signed using the new key, wherein the attestation response includes the new device cryptographic identity.

In Example 78, the subject matter of Example 77 includes, the memory further comprising instructions that, when executed by the processing circuitry, cause the processing circuitry to perform operations to receive the new device identity from the orchestration edge device, wherein the new device identity is signed using a current device cryptographic identity.

Example 79 is at least one non-transitory machine-readable medium including instructions for attestation manifest derivation and distribution that, when executed by processing circuitry, cause the processing circuitry to perform operations to: transmit a software update package manifest to an orchestration edge device; install a software update package associated with the software update package manifest; receive an attestation request from the orchestration edge device; and transmit an attestation response to the orchestration edge device to generate an attestation record.

In Example 80, the subject matter of Example 79 includes, instructions that, when executed by the processing circuitry, cause the processing circuitry to perform operations to communicate with an edge device on an edge device network using the attestation record.

In Example 81, the subject matter of Examples 79-80 includes, instructions that, when executed by the processing circuitry, cause the processing circuitry to perform operations to receive the software update package and the software update package manifest from a software update server.

In Example 82, the subject matter of Examples 79-81 includes, subject matter where the installation of the software update package is based receipt of an installation command from the orchestration edge device and further comprising instructions that, when executed by the processing circuitry, cause the processing circuitry to perform operations to: initiate a reset operation upon completion of installation of the software update package and receipt of a reset command from the orchestration edge device; generate a new key in response to the reset operation; receive a new device cryptographic identity counter-signed using the new key, wherein the attestation response includes the new device cryptographic identity.

In Example 83, the subject matter of Example 82 includes, instructions that, when executed by the processing circuitry, cause the processing circuitry to perform operations to receive the new device identity from the orchestration edge device, wherein the new device identity is signed using a current device cryptographic identity.

Example 84 is a system for attestation manifest derivation and distribution, the system comprising: means for transmitting a software update package manifest to an orchestration edge device; means for installing a software update package associated with the software update package manifest; means for receiving an attestation request from the orchestration edge device; and means for transmitting an attestation response to the orchestration edge device to generate an attestation record. In a specific example, the means for transmitting, installing, and receiving may be implemented by the device 650 through the examples of processing circuitry and communications circuitry as discussed above.

In Example 85, the subject matter of Example 84 includes, means for communicating with an edge device on an edge device network using the attestation record. In a specific example, the means for communicating may be implemented by the device 650 through the examples of processing circuitry and communications circuitry as discussed above.

In Example 86, the subject matter of Examples 84-85 includes, means for receiving the software update package and the software update package manifest from a software update server. In a specific example, the means for receiving may be implemented by the device 650 through the examples of processing circuitry and communications circuitry as discussed above.

In Example 87, the subject matter of Examples 84-86 includes, subject matter where the installation of the software update package is based receipt of an installation command from the orchestration edge device and further comprising: means for initiating a reset operation upon completion of installation of the software update package and receipt of a reset command from the orchestration edge device; means for generating a new key in response to the reset operation; means for receiving a new device cryptographic identity counter-signed using the new key, wherein the attestation response includes the new device cryptographic identity. In a specific example, the means for initiating, generating, and receiving may be implemented by the device 650 through the examples of processing circuitry and communications circuitry as discussed above.

In Example 88, the subject matter of Example 87 includes, means for receiving the new device identity from the orchestration edge device, wherein the new device identity is signed using a current device cryptographic identity. In a specific example, the means for receiving may be implemented by the device 650 through the examples of processing circuitry and communications circuitry as discussed above.

Example 89 is at least one machine-readable medium including instructions that, when executed by processing circuitry, cause the processing circuitry to perform operations to implement of any of Examples 1-88.

Example 90 is an apparatus comprising means to implement of any of Examples 1-88.

Example 91 is a system to implement of any of Examples 1-88.

Example 92 is a method to implement of any of Examples 1-88.

Example 93 is at least one machine-readable storage medium, comprising information representative of instructions that, when executed by processing circuitry, cause the processing circuitry to, perform the operations of any of Examples 1-88.

In the above Detailed Description, various features may be grouped together to streamline the disclosure. However, claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. An orchestration apparatus for attestation manifest derivation and distribution, the orchestration apparatus comprising:
    processing circuitry; and
    memory including instructions that, when executed by the processing circuitry, cause the processing circuitry to perform operations to:
    obtain a software update package manifest from an edge device;
    generate a reference integrity measurement manifest that includes at least one integrity measurement for a reference software update package associated with the software update package manifest based on the software update package manifest, wherein the reference integrity measurement manifest includes a hash of the reference software update package;
    initiate an attestation request with the edge device;
    verify the edge device based on the at least one integrity measurement and a result of the attestation request;
    generate a new device cryptographic identity for the edge device upon verification of a signature for a current device cryptographic identity of the edge device and verification that a hash of a software update package received from the edge device matches the hash of the reference software update package included in the reference integrity measurement manifest; and
    generate an attestation record for the edge device based on the new device cryptographic identity.

2. The orchestration apparatus of claim 1, wherein the edge device operates in a multi-access edge computing (MEC) network according to European Telecommunications Standard Institute (ETSI) group specification (GS) MEC 003 standard.

3. The orchestration apparatus of claim 1, the memory further comprising instructions that, when executed by the processing circuitry, cause the processing circuitry to perform operations to generate a manifest attestation key for the edge device based on a manifest hash of the software update package manifest, wherein the verification of the edge device includes use of the manifest attestation key.

4. The orchestration apparatus of claim 1, the memory further comprising instructions that, when executed by the processing circuitry, cause the processing circuitry to perform operations to:
    sign the new device cryptographic identity with a certificate corresponding to the current device cryptographic identity; and
    transmit the new device cryptographic identity to the edge device, wherein the verification of the edge device includes use of the new device cryptographic identity.

5. The orchestration apparatus of claim 4, the memory further comprising instructions that, when executed by the processing circuitry, cause the processing circuitry to perform operations to:
    transmit the reference software update package associated with the software update package manifest to the edge device;
    initiate a reset of the edge device; and
    counter-sign the new device cryptographic identity with a new key generated in response to the reset of the edge device.

6. The orchestration apparatus of claim 1, the memory further comprising instructions that, when executed by the processing circuitry, cause the processing circuitry to perform operations to issue a token to the edge device based on the verification of the edge device.

7. The orchestration apparatus of claim 1, the memory further comprising instructions that, when executed by the processing circuitry, cause the processing circuitry to perform operations to update an attestation manifest for the edge device based on the software update package manifest.

8. A method for attestation manifest derivation and distribution comprising:
obtaining a software update package manifest from an edge device;
generating a reference integrity measurement manifest that includes at least one integrity measurement for a reference software update package associated with the software update package manifest based on the software update package manifest, wherein the reference integrity measurement manifest includes a hash of the reference software update package;
initiating an attestation request with the edge device;
verifying the edge device based on the at least one integrity measurement and a result of the attestation request;
generating a new device cryptographic identity for the edge device upon verification of a signature for a current device cryptographic identity of the edge device and verification that a hash of a software update package received from the edge device matches the hash of the reference software update package included in the reference integrity measurement manifest; and
generating an attestation record for the edge device based on the new device cryptographic identity.

9. The method of claim 8, wherein the edge device operates in a multi-access edge computing (MEC) network according to European Telecommunications Standard Institute (ETSI) group specification (GS) MEC 003 standard.

10. The method of claim 8, further comprising generating a manifest attestation key for the edge device based on a manifest hash of the software update package manifest, wherein the verification of the edge device includes use of the manifest attestation key.

11. The method of claim 8, further comprising:
signing the new device cryptographic identity with a certificate corresponding to the current device cryptographic identity; and
transmitting the new device cryptographic identity to the edge device, wherein the verification of the edge device includes use of the new device cryptographic identity.

12. The method of claim 11, further comprising:
transmitting the reference software update package associated with the software update package manifest to the edge device;
initiating a reset of the edge device; and
counter-signing the new device cryptographic identity with a new key generated in response to the reset of the edge device.

13. The method of claim 8, further comprising issuing a token to the edge device based on the verification of the edge device.

14. The method of claim 8, further comprising updating an attestation manifest for the edge device based on the software update package manifest.

15. At least one non-transitory machine-readable medium including instructions for attestation manifest derivation and distribution that, when executed by processing circuitry, cause the processing circuitry to perform operations to:
obtain a software update package manifest from an edge device;
generate a reference integrity measurement manifest that includes at least one integrity measurement for a reference software update package associated with the software update package manifest based on the software update package manifest, wherein the reference integrity measurement manifest includes a hash of the reference software update package;
initiate an attestation request with the edge device;
verify the edge device based on the at least one integrity measurement and a result of the attestation request;
generate a new device cryptographic identity for the edge device upon verification of a signature for a current device cryptographic identity of the edge device and verification that a hash of a software update package received from the edge device matches the hash of the reference software update package included in the reference integrity measurement manifest; and
generate an attestation record for the edge device based on the new device cryptographic identity.

16. The at least one non-transitory machine-readable medium of claim 15, wherein the edge device operates in a multi-access edge computing (MEC) network according to European Telecommunications Standard Institute (ETSI) group specification (GS) MEC 003 standard.

17. The at least one non-transitory machine-readable medium of claim 15, further comprising instructions that, when executed by the processing circuitry, cause the processing circuitry to perform operations to generate a manifest attestation key for the edge device based on a manifest hash of the software update package manifest, wherein the verification of the edge device includes use of the manifest attestation key.

18. The at least one non-transitory machine-readable medium of claim 15, further comprising instructions that, when executed by the processing circuitry, cause the processing circuitry to perform operations to:
sign the new device cryptographic identity with a certificate corresponding to the current device cryptographic identity; and
transmit the new device cryptographic identity to the edge device, wherein the verification of the edge device includes use of the new device cryptographic identity.

19. The at least one non-transitory machine-readable medium of claim 18, further comprising instructions that, when executed by the processing circuitry, cause the processing circuitry to perform operations to:
transmit the reference software update package associated with the software update package manifest to the edge device;
initiate a reset of the edge device; and
counter-sign the new device cryptographic identity with a new key generated in response to the reset of the edge device.

20. The at least one non-transitory machine-readable medium of claim 15, further comprising instructions that, when executed by the processing circuitry, cause the processing circuitry to perform operations to issue a token to the edge device based on the verification of the edge device.

* * * * *